US009906645B2

(12) United States Patent
Mathur et al.

(10) Patent No.: US 9,906,645 B2
(45) Date of Patent: Feb. 27, 2018

(54) REWINDING A REAL-TIME COMMUNICATION SESSION

(71) Applicant: QUALCOMM Incorporated, San Diego, CA (US)

(72) Inventors: Vaibhav Mathur, San Diego, CA (US); Mark Aaron Lindner, Verona, WI (US); Saritha Sivapuram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 603 days.

(21) Appl. No.: 14/230,825

(22) Filed: Mar. 31, 2014

(65) Prior Publication Data
US 2014/0301246 A1 Oct. 9, 2014

Related U.S. Application Data

(60) Provisional application No. 61/807,962, filed on Apr. 3, 2013.

(51) Int. Cl.
*H04M 3/42* (2006.01)
*H04W 4/16* (2009.01)
(Continued)

(52) U.S. Cl.
CPC .... *H04M 3/42221* (2013.01); *H04L 65/1089* (2013.01); *H04L 65/4015* (2013.01); *H04L 65/4076* (2013.01); *H04L 65/4092* (2013.01); *H04L 65/604* (2013.01); *H04L 65/608* (2013.01); *H04L 65/80* (2013.01);
(Continued)

(58) Field of Classification Search
CPC . H04L 65/4015; H04L 65/80; H04L 65/4029; H04L 65/4092; H04L 65/4076; H04L 65/1089; H04L 65/608; H04M 3/42221; H04W 4/16
USPC ....... 370/259, 310, 328, 338, 464, 465, 473, 370/476; 455/403, 422.1, 7, 9, 24
See application file for complete search history.

(56) References Cited

U.S. PATENT DOCUMENTS 5,692,213 A 11/1997 Goldberg et al.
6,959,075 B2 10/2005 Cutaia et al.
(Continued)

FOREIGN PATENT DOCUMENTS

WO 2009097230 A1 8/2009

OTHER PUBLICATIONS

International Search Report and Written Opinion—PCT/US2014/032561—ISA/EPO—dated Jul. 17, 2014.
(Continued)

*Primary Examiner* — Obaidul Huq
(74) *Attorney, Agent, or Firm* — MG-IP Law, P.C.

(57) ABSTRACT

In an embodiment, a transmitting device transmits a real-time media stream for a real-time communication session to a set of target devices. At least one of the set of target devices detects a media reception gap in the real-time communication session, and transmits a rewind request to the transmitting device to trigger the transmitting device to generate and provide a time-delayed version of the real-time media stream that includes media lost during the media reception gap. The transmitting device generates a rewind stream based on the rewind request and transmits the rewind stream to the at least one target device.

30 Claims, 19 Drawing Sheets

(51) Int. Cl.
*H04W 24/08* (2009.01)
*H04L 29/06* (2006.01)

(52) U.S. Cl.
CPC ............ *H04W 4/16* (2013.01); *H04W 24/08* (2013.01); *H04L 65/1083* (2013.01)

(56) References Cited

U.S. PATENT DOCUMENTS

| | | | |
|---|---|---|---|
| 7,636,327 B1* | 12/2009 | Doran | 370/276 |
| 8,121,277 B2 | 2/2012 | Baird | |
| 8,559,319 B2 | 10/2013 | Katis et al. | |
| 2005/0021821 A1* | 1/2005 | Turnbull | H04L 12/28 709/232 |
| 2008/0062990 A1* | 3/2008 | Oran | 370/392 |
| 2009/0198827 A1* | 8/2009 | Hughes | 709/231 |
| 2011/0126255 A1* | 5/2011 | Perlman | 725/116 |
| 2012/0314573 A1* | 12/2012 | Edwards | 370/252 |

OTHER PUBLICATIONS

Guo M., et al., "Scalable live video streaming to cooperative clients using time shifting and video patching," Twenty-third Annual Joint Conference of the IEEE Computer and Communications Societies, Mar. 7-11, 2004, vol. 3. pp. 1501-1511.

* cited by examiner

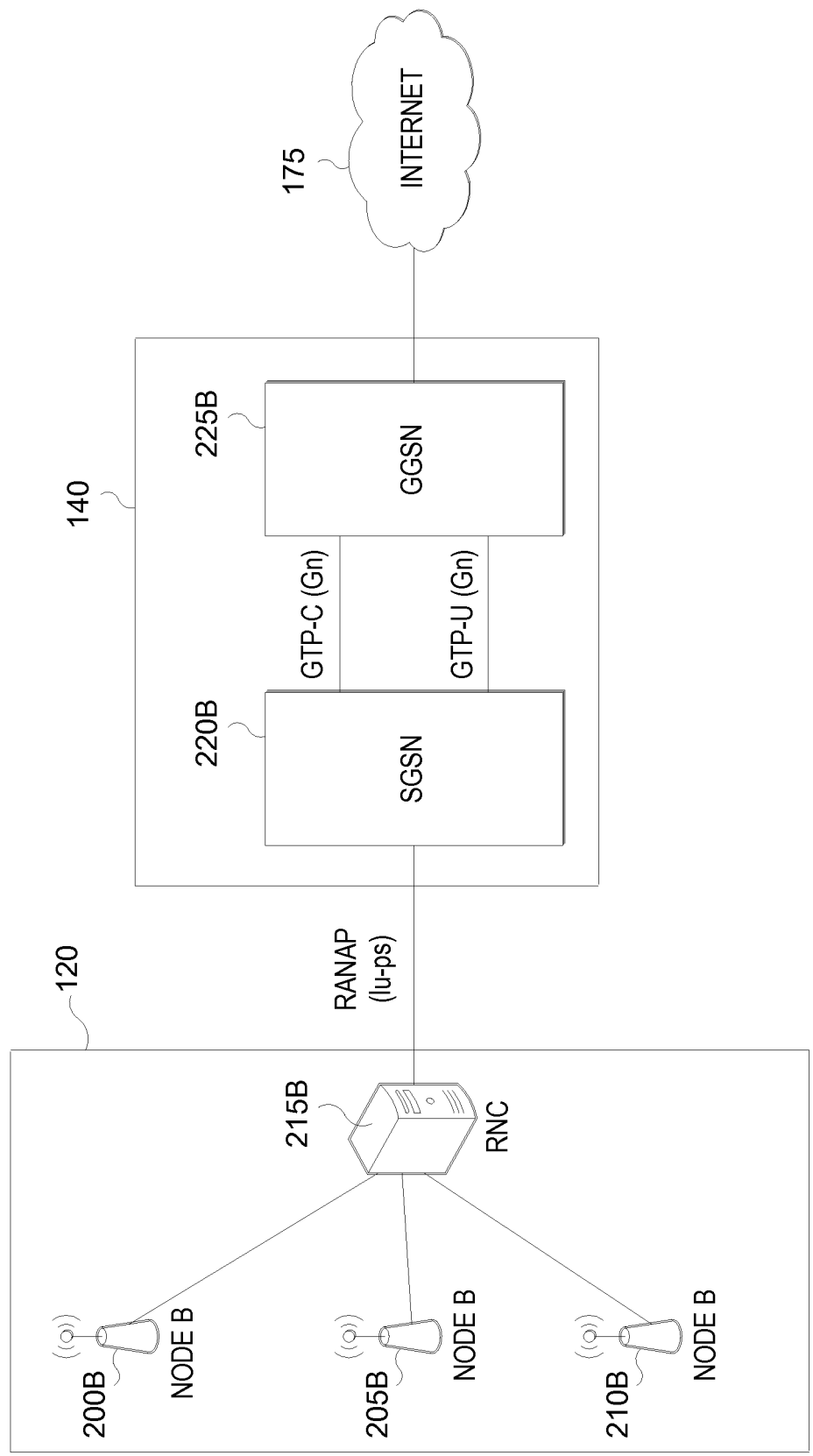

REWINDING A REAL-TIME COMMUNICATION SESSION

CLAIM OF PRIORITY UNDER 35 U.S.C. §119

The present application for patent claims the benefit of Provisional Application No. 61/807,962, entitled "REWINDING A REAL-TIME COMMUNICATION SESSION", filed Apr. 3, 2013, by the same inventors as the subject application, assigned to the assignee hereof and hereby expressly incorporated by reference herein in its entirety.

BACKGROUND OF THE INVENTION

1. Field of the Invention

Embodiments of the invention relate to rewinding a real-time group communication session.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

In any of the aforementioned communication protocols, user equipments (UEs) can engage in communication sessions with other UEs whereby media (e.g., audio media, video media, etc.) is exchanged and played in 'real-time'. In real-time communication sessions, the value of media drops precipitously as time (e.g., mere seconds of tenths of a second) goes by. For example, audio data (e.g., one or more audio frames) contained in an audio packet received during a phone call typically need to be played relatively soon (e.g., 100-200 ms) after receipt by a target UE, or else the audio data will not have relevance to the phone call. Also, if the audio packet is lost during the phone call, it can take a relatively long time (e.g., several seconds) to re-obtain the lost audio packet (e.g., from the speaker or a server that archives audio packets for the phone call). To mitigate packet loss during real-time communication sessions, mechanisms such as forward error correction (FER) or interleaving are used.

However, if a relatively long outage in a target UE's media occurs during a real-time communication session (e.g., the target UE drives into a tunnel for 8 seconds and loses all media packets transmitted during that period), there is generally little recourse for the target UE in terms of recovering the lost media packets during the outage while also maintaining active participation in the real-time communication session. Some systems are set-up to record or archive real-time communication sessions, in which case the target UE can later attempt to tune to the lost portion from the archived session, but this generally is not possible to implement in a convenient manner while the real-time communication session is ongoing.

SUMMARY

In an embodiment, a transmitting device transmits a real-time media stream for a real-time communication session to a set of target devices. At least one of the set of target devices detects a media reception gap in the real-time communication session, and transmits a rewind request to the transmitting device to trigger the transmitting device to generate and provide a time-delayed version of the real-time media stream that includes media lost during the media reception gap. The transmitting device generates a rewind stream based on the rewind request and transmits the rewind stream to the at least one target device.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 2B illustrates an example configuration of the RAN and a packet-switched portion of a General Packet Radio Service (GPRS) core network within a 3G UMTS W-CDMA system in accordance with an embodiment of the invention.

DETAILED DESCRIPTION

Figure 1:
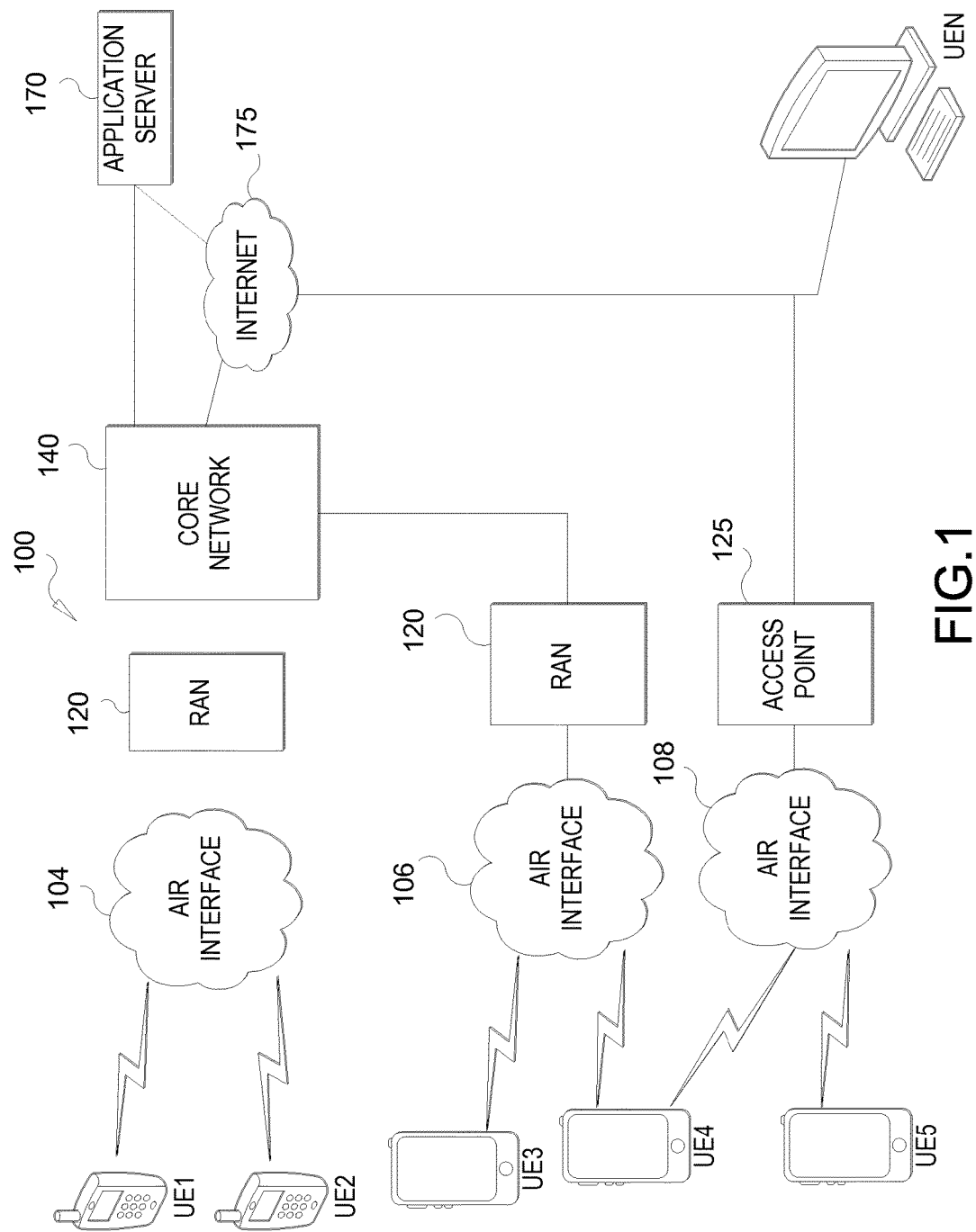
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
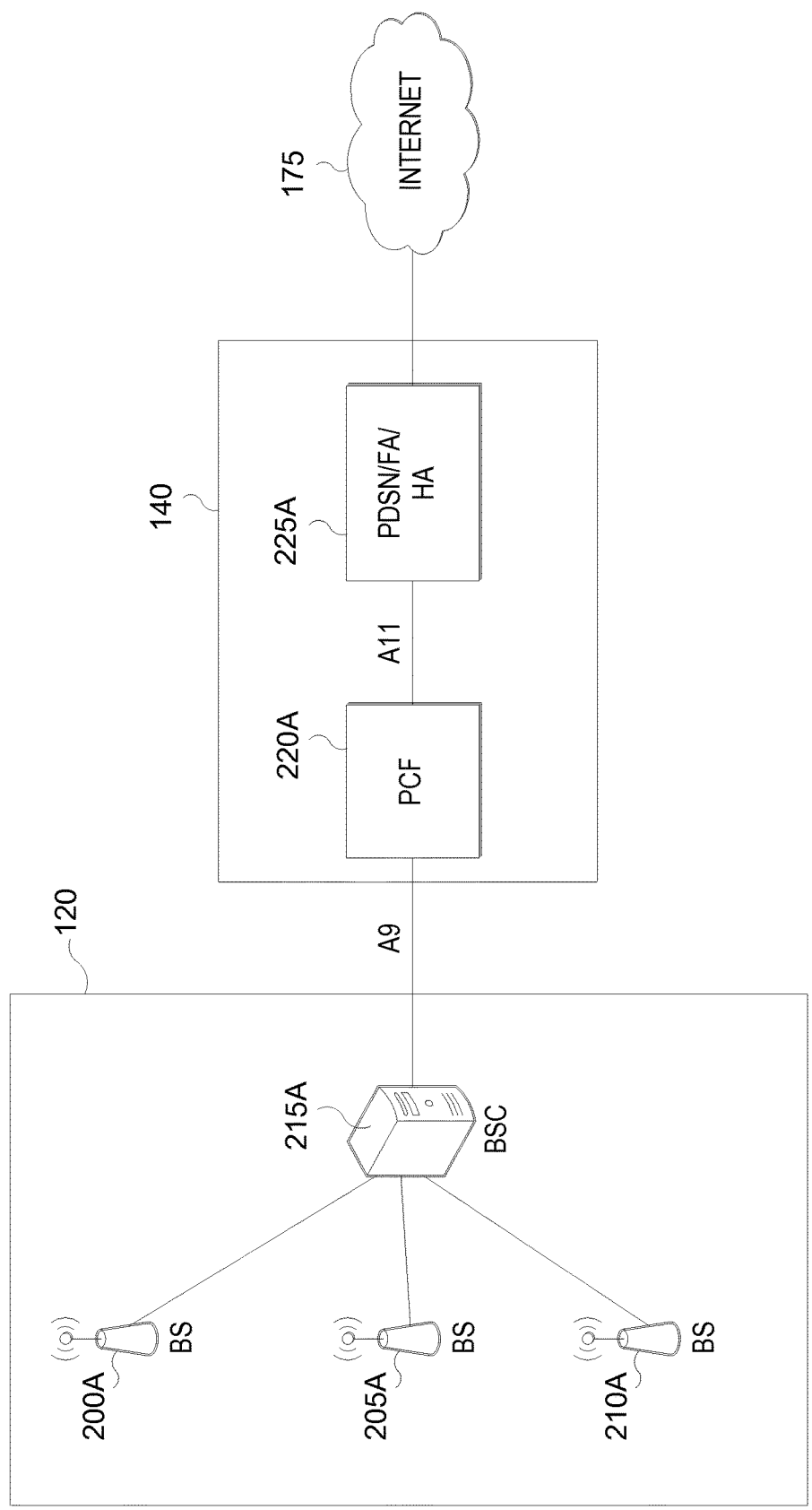
FIG. 2A illustrates an example configuration of a radio access network (RAN) and a packet-switched portion of a core network for a 1× EV-DO network in accordance with an embodiment of the invention.

FIG. 2A illustrates an example configuration of the RAN 120 and the core network 140 for packet-switched communications in a CDMA2000 1× Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1× EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
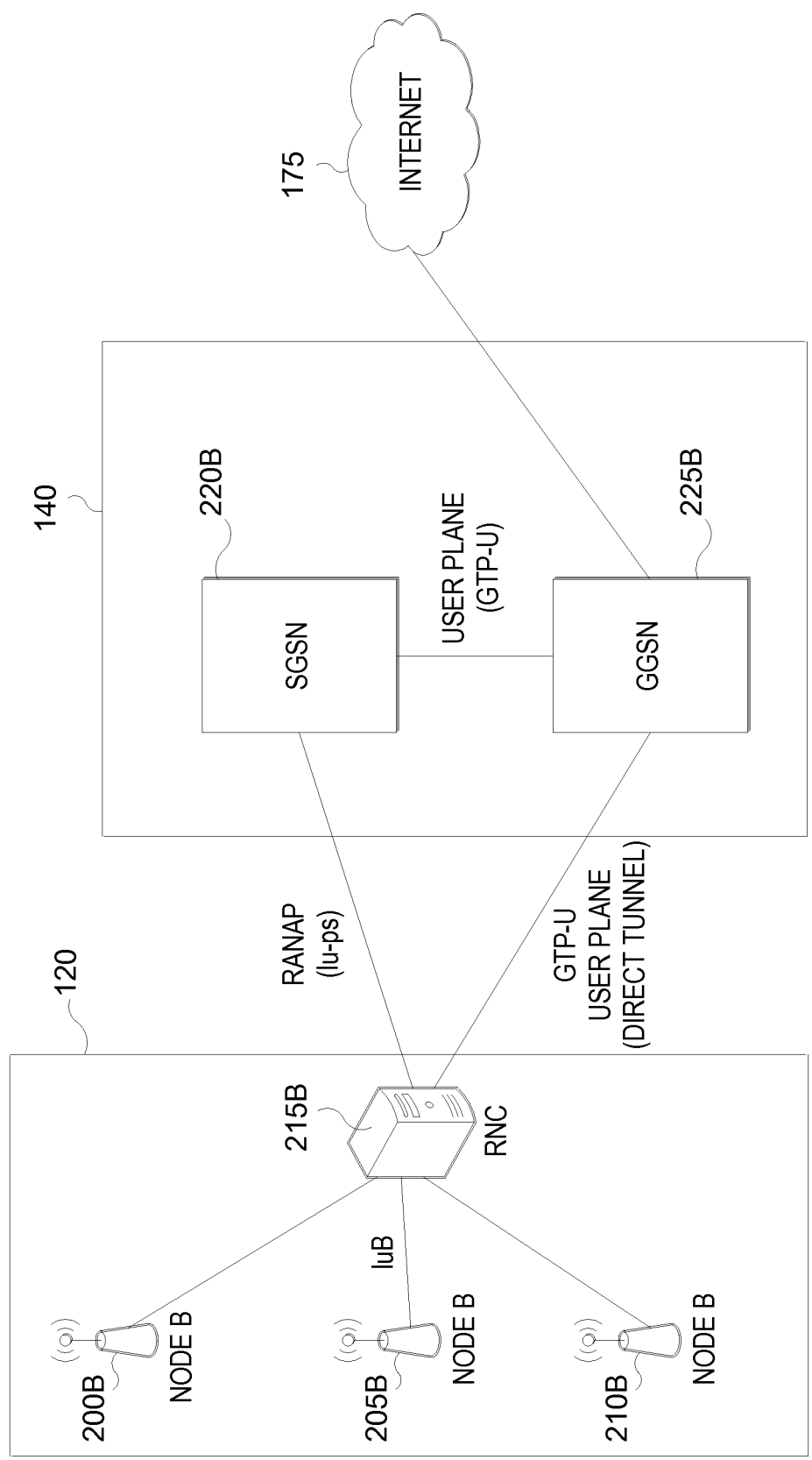
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
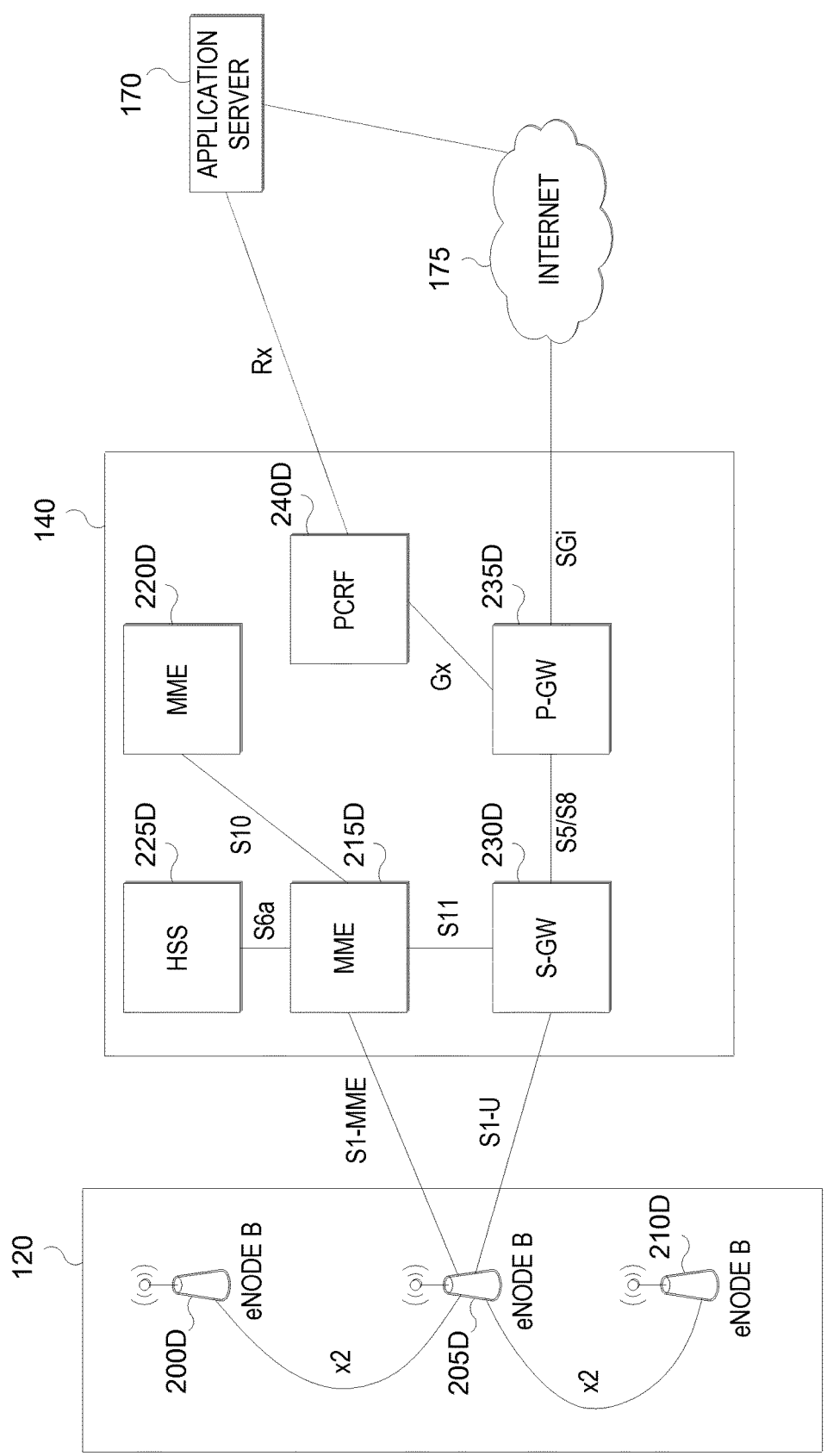
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
| --- | --- |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
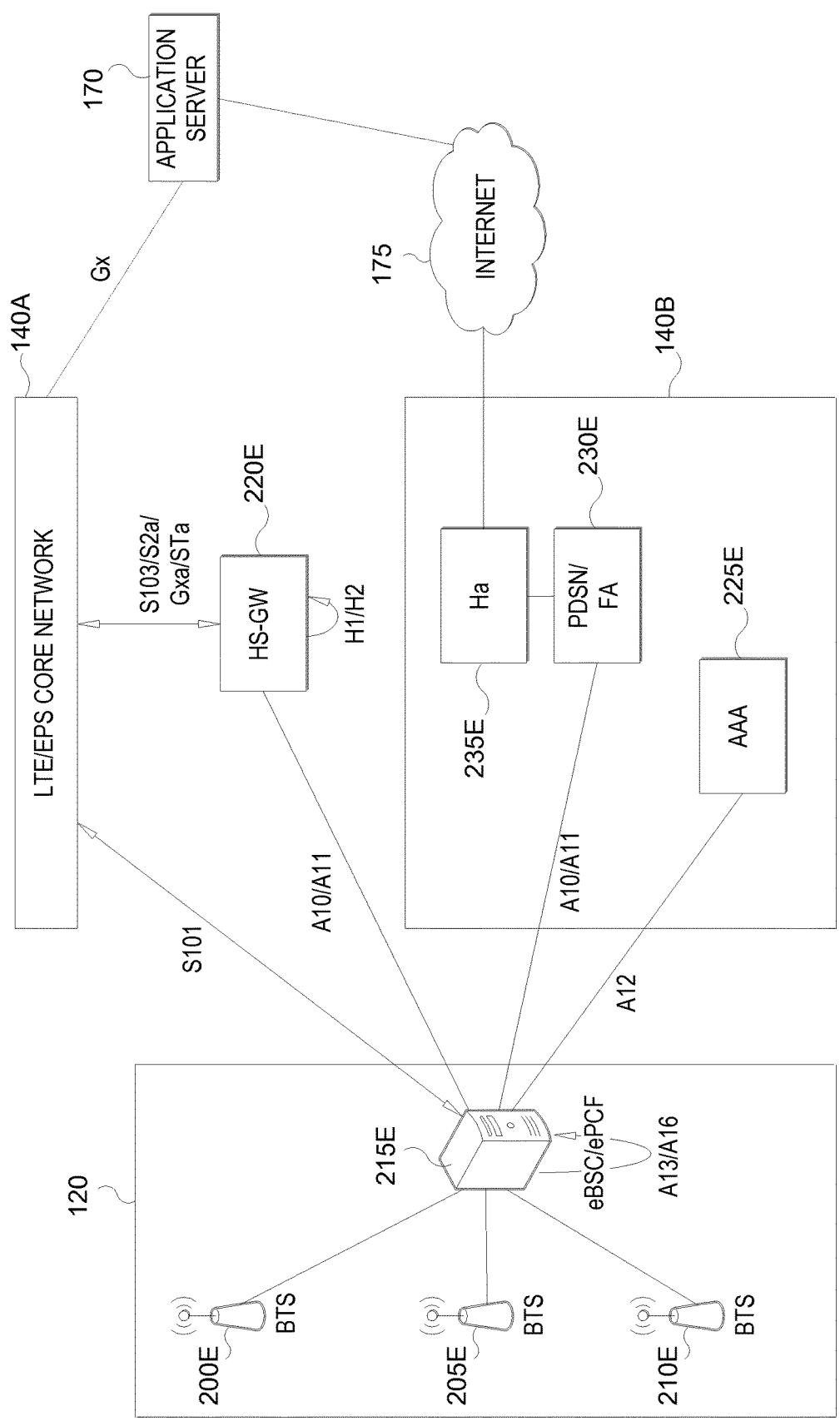
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an 5103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
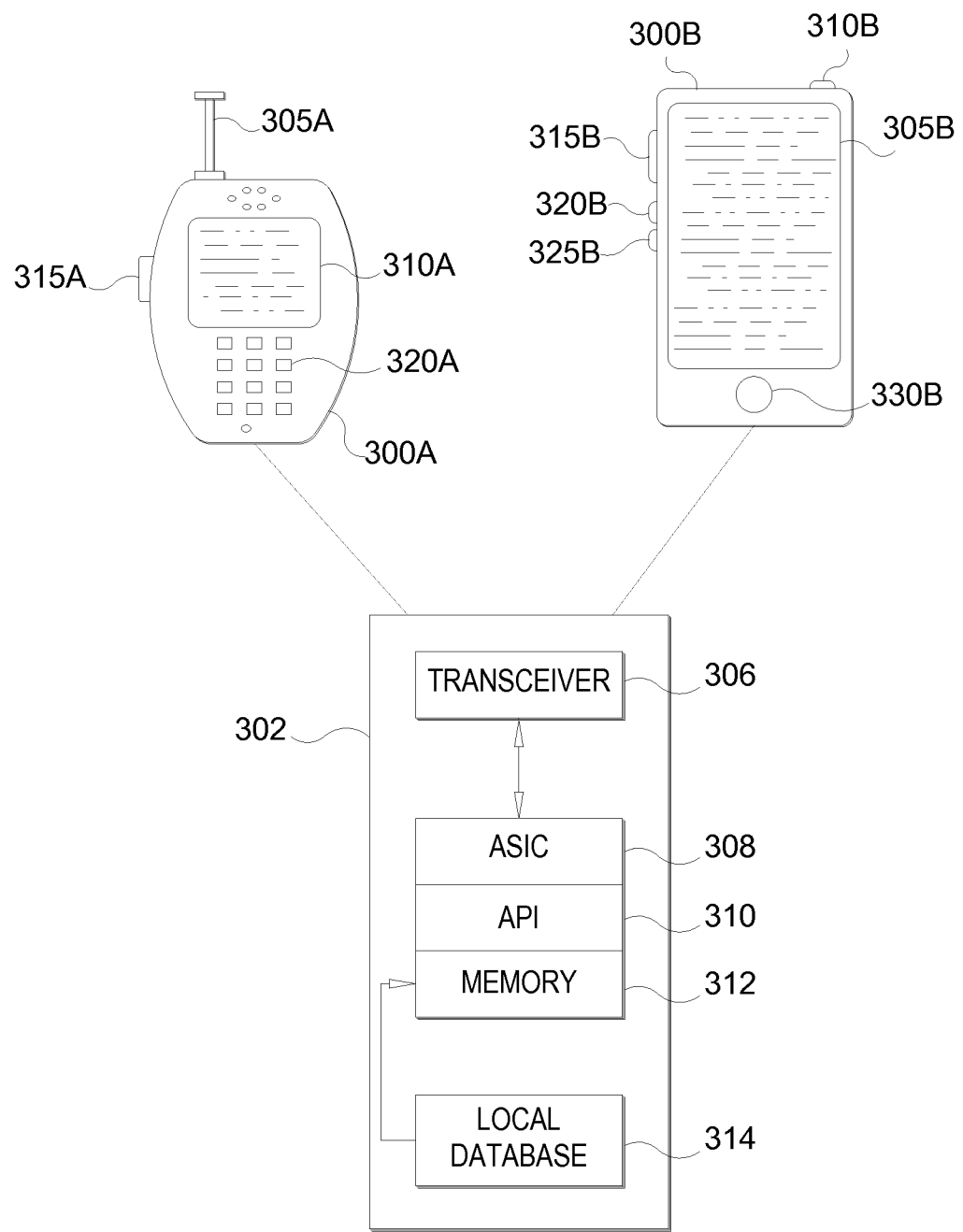
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
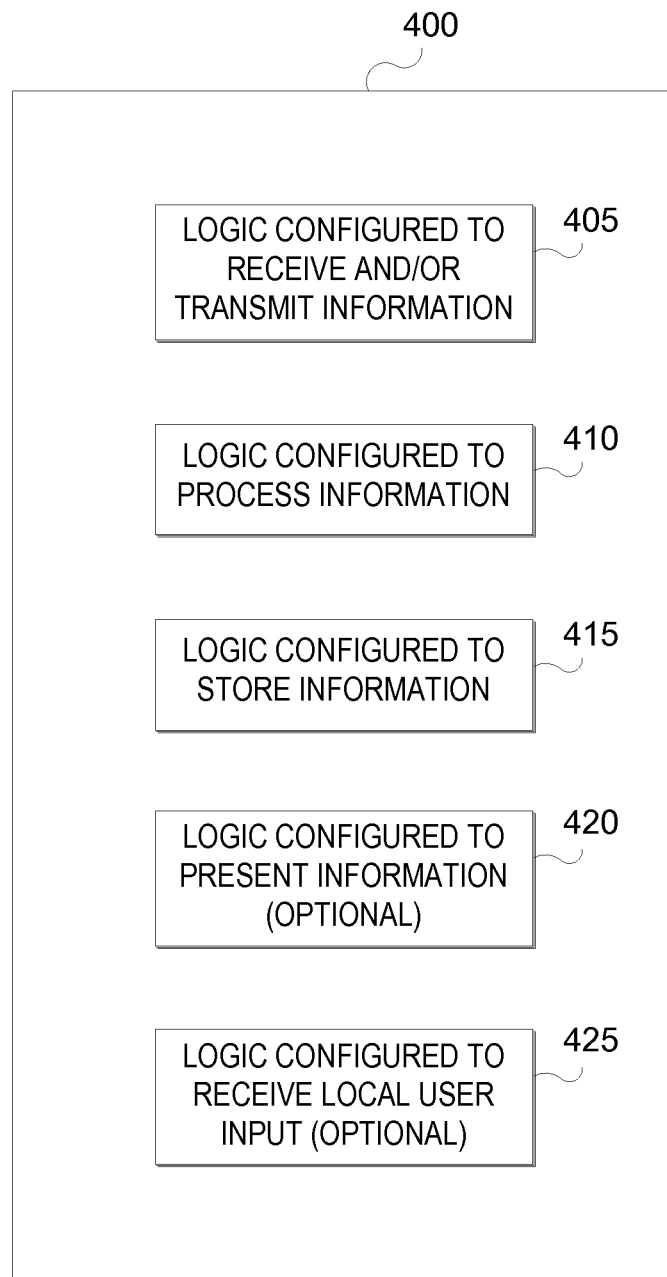
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
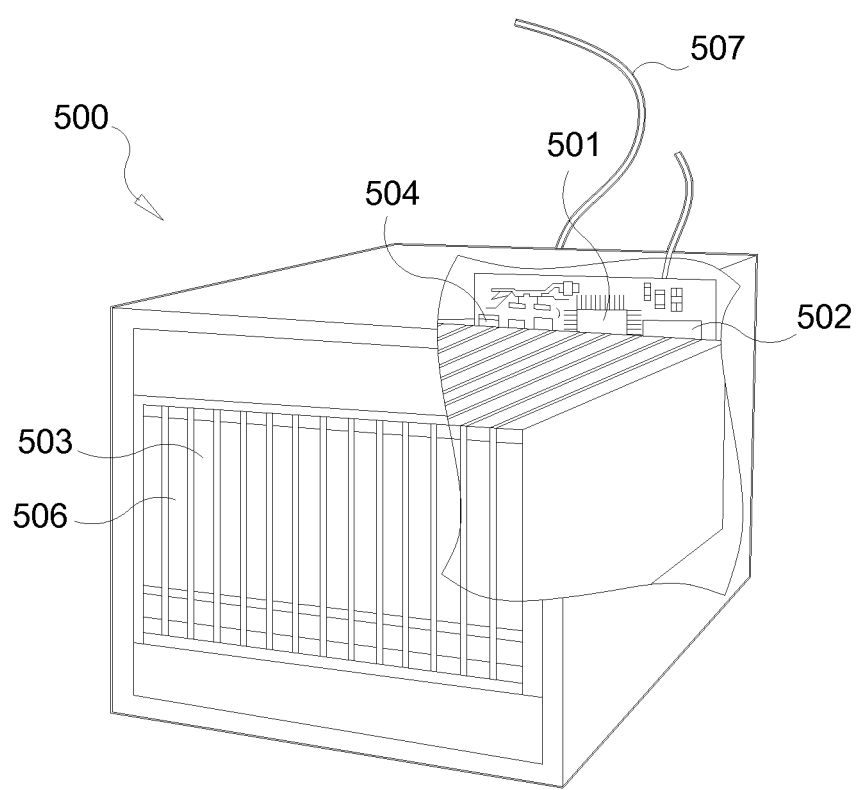
FIG. 5 illustrates a server in accordance with an embodiment of the invention.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 500 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access ports 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

In any of the aforementioned communication protocols (e.g., EV-DO, W-CDMA, LTE, eHRPD, etc.), user equipments (UEs) can engage in communication sessions with other UEs whereby media (e.g., audio media, video media, etc.) is exchanged and played in 'real-time'. In real-time communication sessions, the value of media drops precipitously as time (e.g., mere seconds of tenths of a second) goes by. For example, audio data (e.g., one or more audio frames) contained in an audio packet received during a phone call typically need to be played relatively soon (e.g., 100-200 ms) after receipt by a target UE, or else the audio data will not have relevance to the phone call. Also, if the audio packet is lost during the phone call, it can take a relatively long time (e.g., several seconds) to re-obtain the lost audio packet (e.g., from the speaker or a server that archives audio packets for the phone call). To mitigate packet loss during real-time communication sessions, mechanisms such as forward error correction (FER) or interleaving are used.

However, if a relatively long outage in a target UE's media occurs during a real-time communication session (e.g., the target UE drives into a tunnel for 8 seconds and loses all media packets transmitted during that period), there is generally little recourse for the target UE in terms of recovering the lost media packets during the outage while also maintaining active participation in the real-time communication session. Some systems are set-up to record or archive real-time communication sessions, in which case the target UE can later attempt to tune to the lost portion from the archived session, but this generally is not possible to implement in a convenient manner while the real-time communication session is ongoing.

Figure 6:
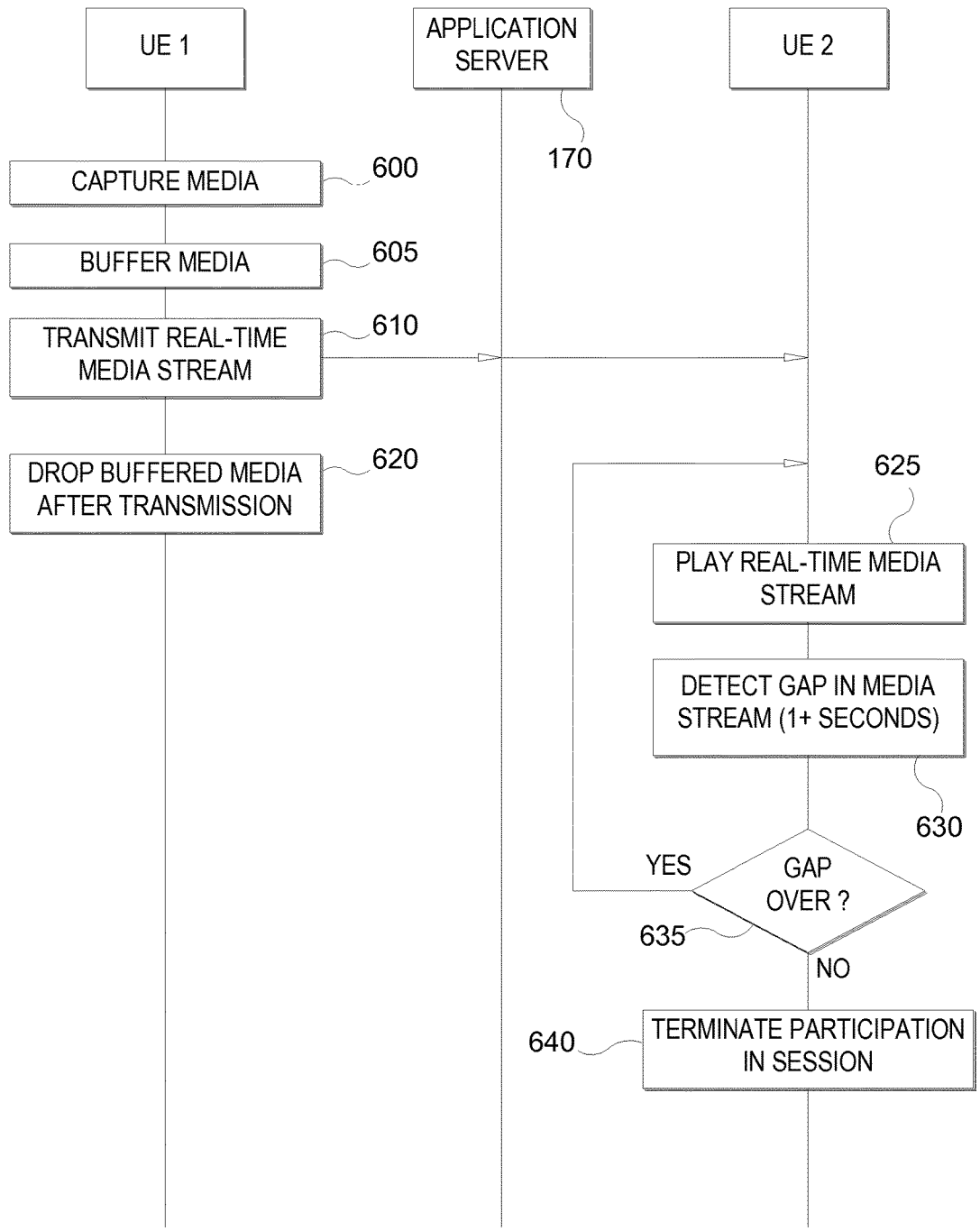
FIG. 6 illustrates a conventional real-time communication session that is arbitrated by an application server whereby a transmitting UE is delivering media a target UE.

FIG. 6 illustrates a conventional real-time communication session that is arbitrated by the application server 170 whereby UE 1 is delivering media (e.g., audio media, video media, etc.) to UE 2. The real-time communication session in FIG. 6 can be half-duplex or full-duplex even though FIG. 6 focuses upon the flow of uni-directional media packets from UE 1 to UE 2. In an example, the real-time communication session in FIG. 6 can correspond to a real-time transport protocol (RTP) over user datagram protocol (UDP) session, whereby media (e.g., audio media, video media, etc.) is contained within RTP packets that each include at least one media frame.

Referring to FIG. 6, during the real-time communication session, UE 1 captures media, 600. The media capture that occurs at 600 can correspond to an audio recording device (e.g., a microphone) capturing audio data such as speech of an operator of UE 1, and/or to a video recording device (e.g., a camera) capturing video data of an environment of UE 1. UE 1 buffers the captured media within a set of media packets, 605. The captured buffered media is transmitted to UE 2 via the application server 170 as a real-time media stream, 610. After specific media is transmitted by UE 1, the transmitted media is removed from UE 1's buffer, 620. At 625, UE 2 receives, buffers and plays the real-time media stream.

At some point during the real-time communication session, assume that UE 2 detects a significant time gap (e.g., one second, two seconds, seven seconds, etc.) where zero or very few usable media packets for the real-time media stream successfully arrive at UE 2 for the real-time communication session (e.g., due to interference or poor channel conditions at either UE 1 or UE 2, a poor backhaul connection, etc.), 630. UE 2 continues to attempt to decode any incoming media packets for the real-time media stream at 635 to determine whether UE 2's participation in the real-time communication session can continue (i.e., whether the gap is over). If UE 2 is able to again tune to the real-time media stream at 635, the process returns to 625 and UE 2 renews playback for the real-time media stream. In this case, any unusable or undelivered media packets from the time gap detected at 630 are not recovered and are simply not played at UE 2. Otherwise, if UE 2 is unable to again tune to the real-time media stream at 635, UE 2 ends its participation in the real-time communication session, 640.

Embodiments of the invention are directed to temporarily 'rewinding' a real-time communication session for at least one target device while in-session. By rewinding the real-time communication session in this manner, users that lose a significant portion of the session can recover at least some part of the lost session portion.

Figure 7:
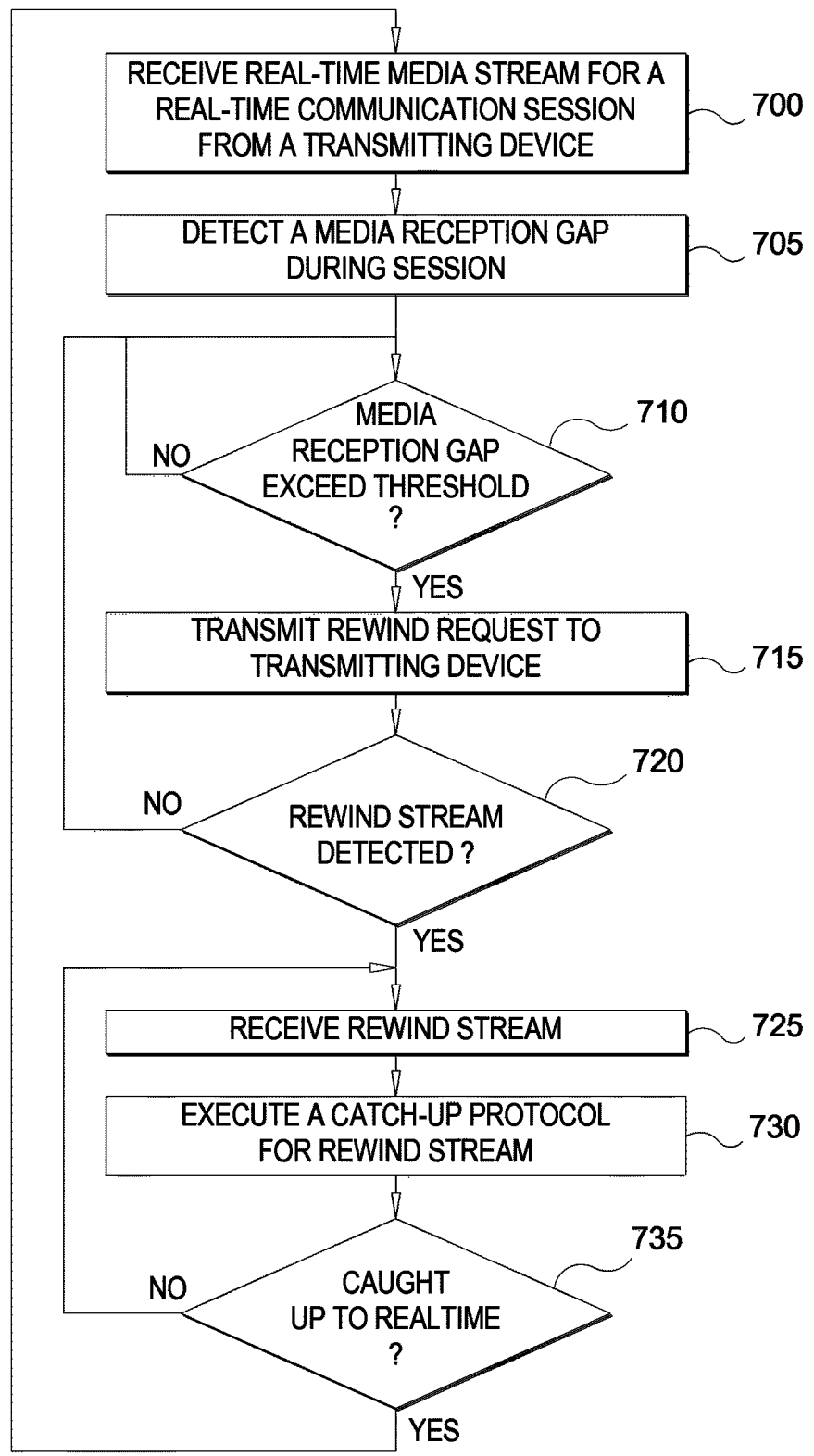
FIG. 7 illustrates a process whereby a target device requests a rewind stream in order to continue participation in the real-time communication session in accordance with an embodiment of the invention.

FIG. 7 illustrates a process whereby a target device requests a rewind stream in order to continue participation in the real-time communication session in accordance with an embodiment of the invention. The target device that performs the process of FIG. 7 can correspond either to (i) a target UE participating in the real-time communication session, or (ii) the application server 170 arbitrating and/or mediating the real-time communication session.

Referring to FIG. 7, the target device receives a real-time media stream for a real-time communication session from a transmitting device, 700. If the target device corresponds to the application server 170, the target device also delivers the real-time media stream to at least one target UE at 700. Alternatively, if the target device corresponds to the target UE, the target device also plays the real-time media stream at 700. Also, if the target device corresponds to the application server 170, the transmitting device corresponds to the transmitting UE. Alternatively, if the target device corresponds to the target UE, the transmitting device can correspond to either the transmitting UE (i.e., the originating source of the real-time media stream) or the application server 170 (i.e., which forwards the real-time media stream on behalf of the transmitting UE).

At some point during the real-time communication session, the target device detects a media reception gap, 705. As used herein, the media reception gap detected at 705 can correspond to a time gap (e.g., one second, two seconds, seven seconds, etc.) where less than a threshold number (e.g., 1, 3, etc.) of usable media packets for the real-time media stream successfully arrive at the target device for the real-time communication session (e.g., due to degrading network conditions such as interference or poor channel conditions, a poor backhaul connection, etc.), similar to 630 of FIG. 6. Alternatively, the media reception gap detected at 705 can correspond to a time gap where the threshold number of usable media packets successfully arrive at the target device for the real-time communication session but conditions at the target device inhibit playback. For example, a user of the target device walks by a loud environment where the user would not be expected to hear audio media if it were played, the user of the target device walks away from the target device itself for a period of time, etc. In yet another alternative, the media reception gap can be detected at 705 based on an explicit indication that the user of the target UE wants to rewind the session. In this case, the target device may have registered that the real-time media stream was playing correctly but, for some reason, the user still wants to rewind the session a few seconds (e.g., to recover an important sentence that was missed, etc.). Thereby, the media reception gap can either be device-detected or can be user-detected at 705.

At 710, the target device determines if the duration of the media reception gap exceeds a threshold. If the target device determines that the duration of the media reception gap does not yet exceed the threshold at 710, the target device attempts to decode any incoming media packets for the real-time media stream at 710 while continuing to track the duration of the media reception gap. While not shown in FIG. 7, if the media reception gap ends before exceeding the threshold, the real-time communication session can resume at 700 without a rewind. Alternatively, if the target device determines that the duration of the media reception gap exceeds the threshold at 710, the target device generates and transmits a rewind request to the transmitting device to request that the transmitting device rewind the real-time communication session, 715.

Referring to 715 of FIG. 7, the rewind request transmitted at 715 can either be implicit or explicit. An "explicit" rewind request corresponds to a message that is sent by the target device to the transmitting device with the intended purpose of triggering the transmitting device to generate and deliver a rewind stream to the target device. An "implicit" rewind request corresponds to any data other than an explicit rewind request that may function to trigger the transmitting device to generate and deliver the rewind stream to the target device. For example, an explicit rewind request may correspond to a request by the target device for the transmitting device to deliver a rewind stream with a 4 second rewind (or lag time) from the real-time media stream, whereas an implicit rewind request may simply notify the transmitting device that the target device suffered a 4 second media reception gap without an actual request for the transmitting device to deliver the rewind stream with the 4 second rewind. In the embodiments below, FIG. 9A through FIG. 11 generally illustrate examples of rewind requests that can be either implicit or explicit, whereas FIG. 12 focuses on data feedback that can be used specifically for implicit rewind requests.

For example, an "explicit" rewind request can be configured to request that the real-time communication session be rewound by a specified amount of time. For example, if the media reception gap is 3 seconds long when the rewind request is transmitted at 715, the rewind request may request a 3 second rewind. Alternatively, to account for delays in terms of response time, the rewind request can be configured to request a longer rewind than the current media reception gap (e.g., if media reception gap is 3 seconds, offset by 2 seconds and request a 5 second rewind). In another alternative, an "implicit" rewind request may be configured to indicate a current media reception gap in order to prompt the transmitting device to independently determine the degree of the rewind (e.g., the target device can report a 3 second media reception gap, and the transmitting device is expected to identify an appropriate amount of time for the rewind based on this information).

Further, the rewind request (either implicit or explicit) can be configured to request that the requested rewind stream either be provided in place of or in addition to the real-time media stream. For example, the target device may desire the rewind stream due to the media reception gap but may not actually want to lose the real-time media stream, which would prompt the rewind request to request that both the rewind stream and the real-time media stream be provided to the target device concurrently. Alternatively, due to bandwidth constraints or other considerations, the target device may want to switch from the real-time media stream to the rewind stream such that only the rewind stream is provided to the target device for a period of time. In this case, the rewind stream will supplant the real-time media stream during the period of time.

After transmitting the rewind request at 715, the target device continues to track the duration of the media reception gap while waiting for the requested rewind stream, 720. If the rewind stream is not received at 720 and after another threshold period of time is determined to elapse at 710, the target device generates and transmits another rewind request that requests a longer rewind, 715, and so on. While not shown in FIG. 7, eventually the media reception gap can become so large that the target device simply gives up on the rewind requests (e.g., a rewind cap of 10 seconds can be enforced, etc.). If this occurs, the target device will simply attempt to continue participation in the real-time communication session in real-time, if possible.

Otherwise, if the rewind stream is detected at 720, the target device receives the rewind stream at 725. The rewind stream received at 725 can correspond to one of the requested rewind streams from 715, or a different rewind stream (e.g., if the transmitting device selects a different rewind duration for the target device, discussed in more detail below). As discussed above, the rewind stream received at 725 can be received either in place of or in addition to the real-time media stream.

At 730, the target device optionally executes a catch-up protocol for the rewind stream. The catch-up protocol corresponds to any mechanism by which the target device can attempt to temporally advance the rewind stream in order to catch-up (or merge) with the real-time media stream. Examples of catch-up protocols include a fast forward protocol (e.g., format the rewind stream to be played at a faster rate than the real-time media stream), a frame skip protocol whereby certain media frames are parsed out of the rewind stream (e.g., skip ⅛ frames, skip media frames in proximity to an event expected to be unassociated with valuable media such as a floor-holder transition for a half-duplex session), analyzing data contained in the rewind stream and converting any audio data to text (if possible) and displaying the text to the user in lieu of outputting audio ("audio captioning"), and so on. Examples of how to caption audio for a communication session are described in more detail within U.S. application Ser. No. 13/796,455, entitled "OUTPUT MANAGEMENT FOR PRESS-TO-TRANSMIT COMMUNICATIONS", by Kerger et al., filed on Mar. 12, 2013 and also within U.S. application Ser. No. 13/796,561, entitled "OUTPUT MANAGEMENT FOR ELECTRONIC COMMUNICATIONS", by Kerger et al., filed on Mar. 12, 2013, which are each hereby incorporated by reference in their entirety.

The catch-up protocol can either be executed directly at the target device, or at the transmitting device. For example, if the target device corresponds to the target UE that is playing the rewind stream, the target UE can independently skip over ⅛ frames or other low-relevance frames, can convert speech-to-text for rewind playback and so on. In another example, if the target device corresponds to the target UE that is playing the rewind stream, the target UE (or its user) can indicate to the transmitting device a preference to execute a particular catch-up protocol. In another example, if the target device corresponds to the application server 170 that is delivering the rewind stream to the target UE, the application server 170 can receive the target UE's indication of a catch-up protocol preference and either relay the preference to the transmitting UE or implement the catch-up protocol at the application server 170 itself. Alternatively, the catch-up protocol can be executed at the transmitting device by default without conveying a catch-up protocol preference to the transmitting device (e.g., the transmitting device automatically sets up the rewind stream to operate in fast forward mode without a request from the target device, etc.).

Referring to 730 of FIG. 7, the option to use the catch-up protocol can be based upon the buffer size at the target device in an example. For example, if the time-delay for the rewind stream at 725 is for a time less than the amount of free space in the target device's buffer, then only the missed spurt needs be rewound and the transmitting device can continue sending the "real-time" spurts in real time, and no 'catch up' is even required as the target device has room for both the rewind stream and the on-going real-time media stream. However, if the time-delay for the rewind stream at 725 is for a time greater than the amount of free space in the target device's buffer, the buffer would overflow if the rewind stream were sent in conjunction with the real-time media stream. In this case, the catch-up protocol can be used at 730 to shift the device back to real-time.

At 735, the target device determines whether the rewind stream has caught up to the real-time media stream. If not, the process returns to 725. At 735, once the target device determines that the rewind stream has caught up to the real-time media stream, the process returns to 700 and the target device resumes participation in the real-time communication session in real-time. At this point, the rewind stream can be dropped, although the rewind stream could separately continue to be delivered to other devices that are still operating (or supporting operation) in rewind mode.

Figure 8:
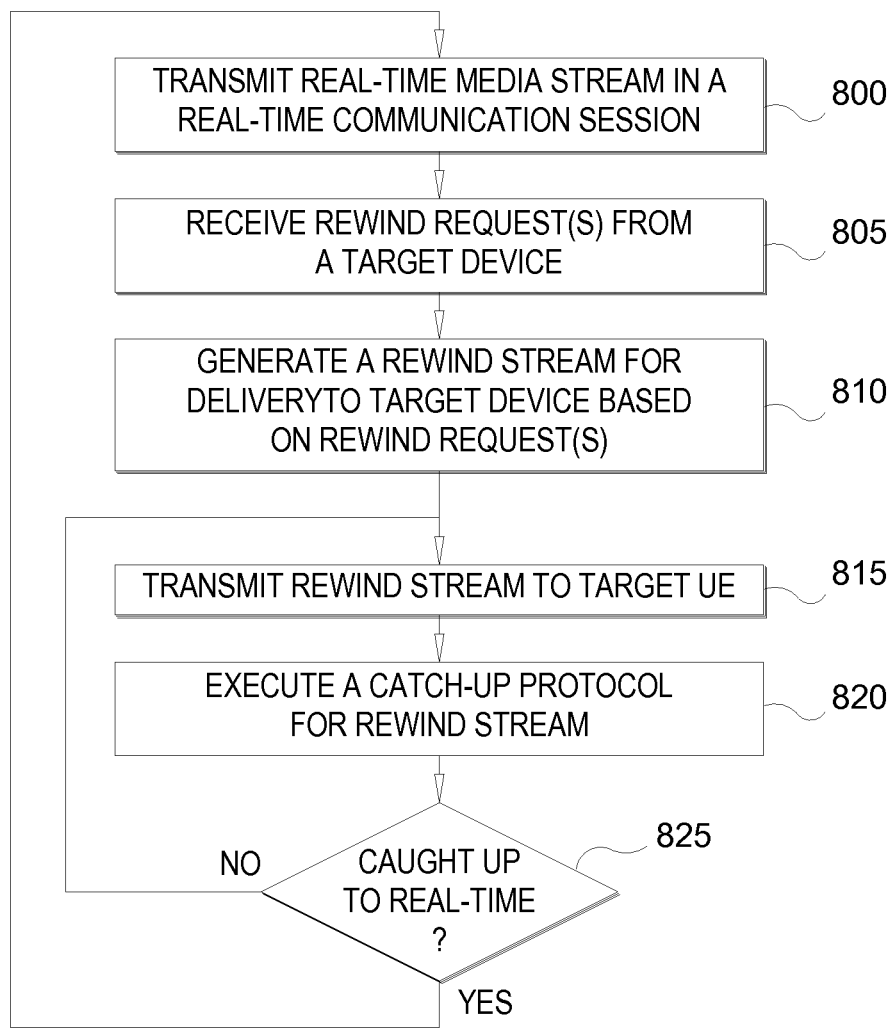
FIG. 8 illustrate a process whereby a transmitting device receives the rewind request and selectively generates and delivers the rewind stream to the target device in accordance with another embodiment of the invention.

FIG. 8 illustrates a process whereby a transmitting device receives the rewind request and selectively generates and delivers the rewind stream to the target device in accordance with another embodiment of the invention. The transmitting device that performs the process of FIG. 8 can correspond either to (i) a transmitting UE that originates the real-time media stream for the real-time communication session, or (ii) the application server 170 arbitrating and/or mediating the real-time communication session.

Referring to FIG. 8, the transmitting device transmits a real-time media stream for a real-time communication session to a target device, 800. If the transmitting device corresponds to the application server 170, the transmitting device transmits the real-time media stream to at least one target UE at 800. Alternatively, if the transmitting device corresponds to the transmitting UE, the transmitting device transmits the real-time media stream to the application server 170 for delivery to at least one target UE at 800.

Referring to FIG. 8, the transmitting device receives one or more rewind requests from the target device at 805. For example, the one or more rewind requests can correspond to the one or more rewind requests transmitted by the target device at 715 of FIG. 7. As discussed above with respect to 715 of FIG. 7, the one or more rewind requests can correspond to either implicit or explicit rewind requests. The transmitting device generates a rewind stream for delivery to the target device based on the received rewind request(s) from 805. In an example, the transmitting device can simply grant one of the received rewind request(s) at 805 (e.g., a rewind request requests a 7 second rewind and the generated rewind stream at 810 is allocated a 7 second delay or rewind from the real-time media stream). In another example, the transmitting device can allocate a slightly different rewind duration than requested by any of the rewind requests (e.g., the target device requests a 7 second rewind but the transmitting device is already providing three other target devices with a 6 second delayed rewind stream so the target device is also provided with the 6 second delayed rewind stream to conserve both processing and system resources). In another example, the target rewind duration or rewind delay can be automatically determined by the transmitting device, or alternatively can be user-controlled. For example, the operator of the transmitting device can be notified of the rewind request(s) from 805 and the operator him/herself can either approve one of the rewind request(s) or can authorize a different rewind delay for the target device. A use-case for this example is where a professor operating a transmitting UE is lecturing a class of 100 students operating target UEs. Different students may be requesting different rewind delays and if a high number of rewind requests arrive at the professor's transmitting UE, the professor may simply opt to rewind the entire session for all target devices by 20-30 seconds (irrespective of the requested rewind delays) so that his/her confused students can catch up.

After generating the rewind stream at 810, the transmitting device transmits the rewind stream to the target device, 815. Also at 815, the transmitting device optionally continues to transmit the real-time media stream to the target device. For example, the rewind request(s) from 805 can be configured to request parallel delivery of both the rewind stream and the real-time media stream, or alternatively the rewind request(s) from 805 can be configured to request that only the rewind stream be delivered so as to temporarily supplant the real-time media stream. Alternatively, the rewind request(s) may not specify whether the real-time media stream should continue to be delivered to the target device and the transmitting device itself can make this decision. For example, if the rewind stream lags behind the real-time media stream by a relatively small amount of time (e.g., less than a threshold amount of time), the real-time media stream can be delivered in to the target device in addition to the rewind stream because the target device is likely to catch-up to real-time relatively quickly. Likewise, if the rewind stream lags behind the real-time media stream by a relatively long amount of time (e.g., at least the threshold amount of time), the real-time media stream can temporarily stop being delivered to the target device because the target device is likely to take a relatively long time to catch-up to real-time. At 820, the transmitting device optionally executes a catch-up protocol for the rewind stream, similar to 730 of FIG. 7 (e.g., fast-forward, skip ⅛ frames or floor-holder transitions, providing audio captioning instead of audio in which case the target device can also be provided with the real-time media stream so that the target UE can listen to real-time audio while reading text from the media reception gap, etc.). As discussed above with respect to 730 of FIG. 7, the option to use the catch-up protocol can be based upon the buffer size at the target device in an example. For example, if the time-delay for the rewind stream at 810-815 is for a time less than the amount of free space in the target device's buffer, then only the missed spurt needs be rewound and the transmitting device can continue sending the "real-time" spurts in real time, and no 'catch up' is even required as the target device has room for both the rewind stream and the on-going real-time media stream. However, if the time-delay for the rewind stream at 810-815 is for a time greater than the amount of free space in the target device's buffer, the buffer would overflow if the rewind stream were sent in conjunction with the real-time media stream. In this case, the catch-up protocol can be used at 820 to shift the device back to real-time.

At 825, the transmitting device determines whether the rewind stream has caught up to the real-time media stream. If not, the process returns to 815. At 825, once the transmitting device determines that the rewind stream has caught up to the real-time media stream, the process returns to 800 and the transmitting device stops sending the rewind stream to the target device and resumes (or continues) to transmit the real-time media stream to the target device. At this point, the rewind stream can be dropped altogether, although the rewind stream could separately continue to be delivered to other target devices that are still operating (or supporting operation) in rewind mode.

Figure 9A:
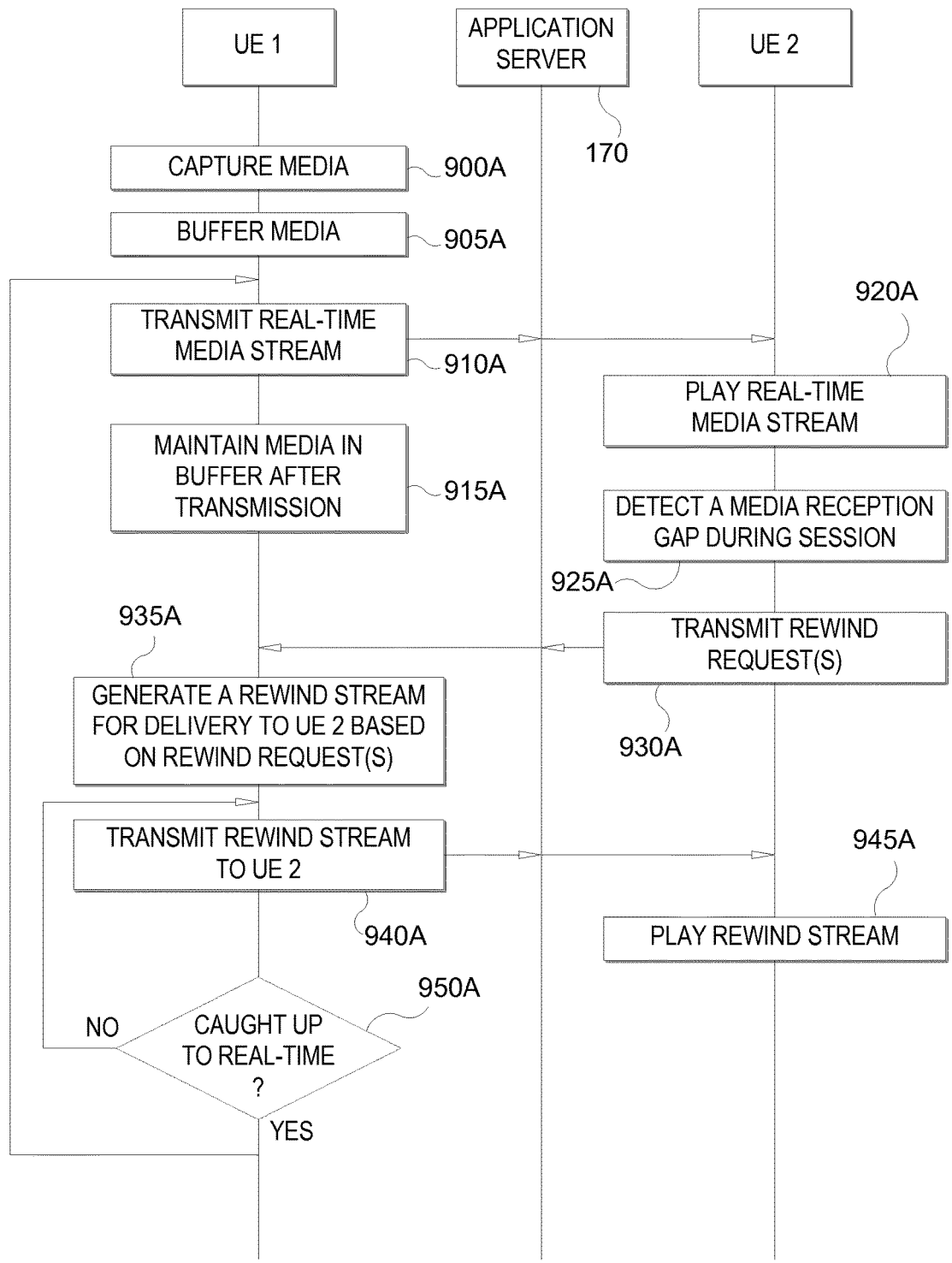
FIG. 9A illustrates an example implementation of the processes of FIGS. 7-8 in accordance with an embodiment of the invention.

FIG. 9A illustrates an example implementation of the processes of FIGS. 7-8 in accordance with an embodiment of the invention. In the embodiment of FIG. 9A, the transmitting device from FIGS. 7-8 corresponds to UE 1 and the target device corresponds to UE 2. In the embodiment of FIG. 9A, the real-time communication session can be half-duplex or full-duplex even though FIG. 9A focuses upon the flow of uni-directional media streams from UE 1 to UE 2. In an example, the real-time communication session in FIG. 9A can correspond to an RTP over UDP session, whereby media (e.g., audio media, video media, etc.) is contained within RTP packets that each include at least one media frame. Also, the real-time communication session in FIG. 9A can correspond to either a 1:1 or direct session or a group session (e.g., where other UEs that are not shown are also participating in the session).

Referring to FIG. 9A, during the real-time communication session, UE 1 captures media, 900A. The media capture that occurs at 900A can correspond to an audio recording device (e.g., a microphone) capturing audio data such as speech of an operator of UE 1, and/or to a video recording device (e.g., a camera) capturing video data of an environment of UE 1. UE 1 buffers the captured media within a set of media packets, 905A, and UE 1 transmits a real-time media stream to UE 2 via the application server 170, 910A. Instead of clearing the buffer from 905A as in 620 of FIG. 6, UE 1 maintains media frames from the real-time media stream in the buffer, 915A, for an extended period of time (e.g., 20 seconds, 25 seconds, etc.) in order to accommodate rewind requests from any target devices participating in the real-time communication session.

Referring to FIG. 9A, UE 2 receives, buffers and plays the real-time media stream, 920A. Later, at some point during the real-time communication session, UE 2 detects a media reception gap, 920A, (e.g., as in 710 of FIG. 7) and UE 2 transmits one or more rewind requests to UE 1, 930A (e.g., as in 715 of FIG. 7). For example, at 930A, UE 2 can transmit rewind requests until the rewind stream is received or the rewind cap (e.g., 10 seconds, N total rewind requests, etc.) is reached.

UE 1 receives the rewind request(s), generates a rewind stream for delivery to UE 2, 935A (e.g., as in 810 of FIG. 8), rewind stream is transmitted to UE 2 at 940A (e.g., as in 815) and UE 2 plays the rewind stream at 945A (e.g., similar to 725 and/or 730 of FIG. 7). While not shown explicitly, UE 1 and/or UE 2 can optionally execute a catch-up protocol with respect to the rewind stream during 940A as discussed above with respect to 730 of FIG. 7 or 820 of FIG. 8. Also, while not shown explicitly, the real-time media stream from 910A can either continue to be transmitted to UE 2 along with the rewind stream at 940A or alternatively the rewind stream can supplant the real-time media stream such that the real-time media stream ceases transmission at 940A. At 950A, UE 1 optionally determines if the rewind stream has caught up to real-time. If not, the process returns to 940A and UE 1 continues to deliver the rewind stream to UE 2. If so, the process returns to, and UE 1 resumes delivery of the real-time media stream to UE 2 (although it is appreciated that UE 2 could have been providing the real-time media stream to other UEs while UE 2 was operating in rewind mode as noted above). In FIG. 9A, 950A is optional and can be based upon the buffer size at the target UE (in this case, UE 2). For example, if the time-delay for the rewind stream at 935A-945A is for a time less than the amount of free space in UE 2's buffer, then only the missed spurt needs be rewound and the speaker can continue sending the "real-time" spurts in real time, and no 'catch up' is even required as the receiver has room for both the rewind stream and the on-going real-time media stream. However, if the time-delay for the rewind stream at 935A-945A is for a time greater than the amount of free space in UE 2's buffer, UE 2's buffer would overflow if the rewind stream were sent in conjunction with the real-time media stream. In this case, the catch-up protocol can be used between 940A-950A to shift UE 2 back to real-time.

Figure 9B:
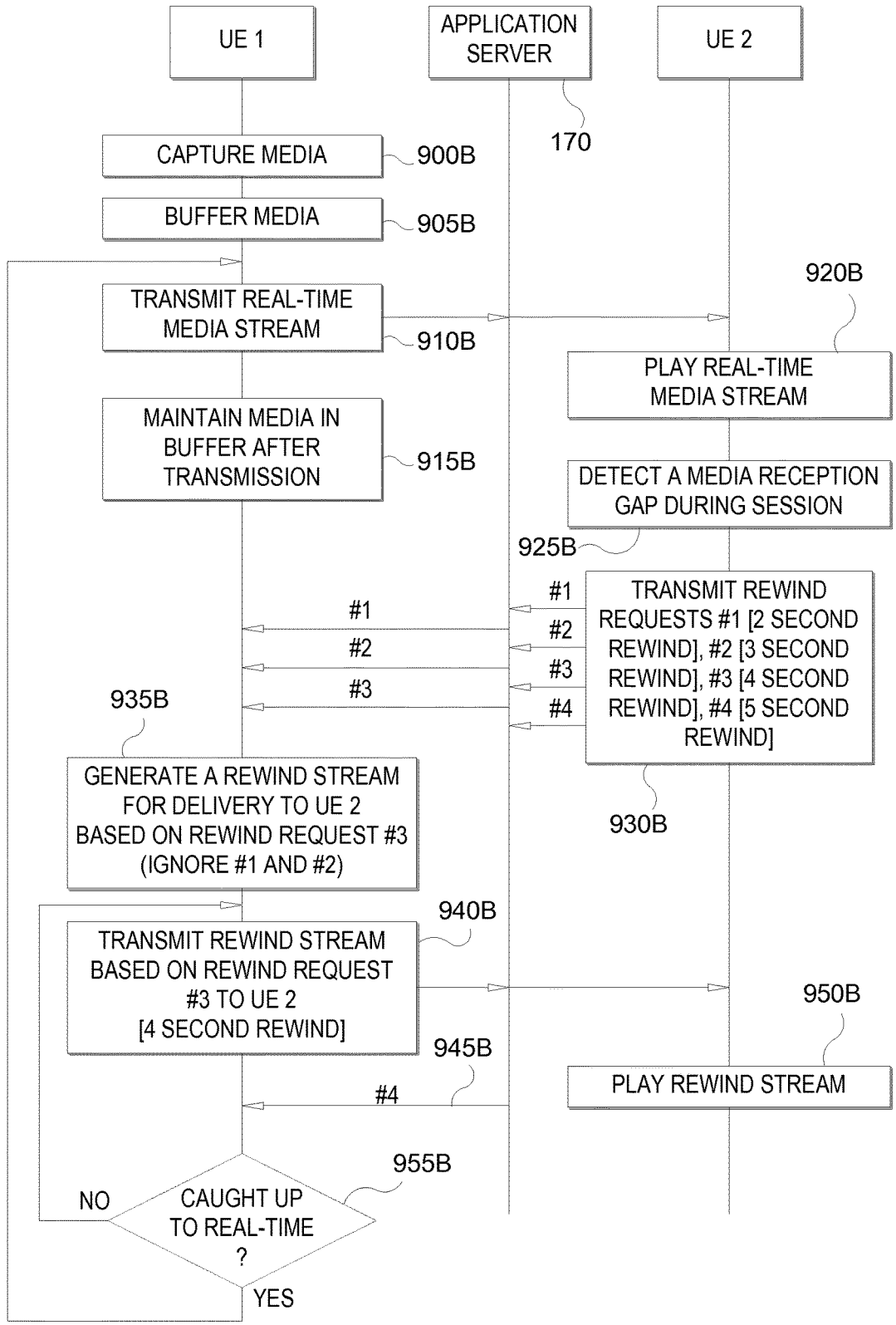
FIG. 9B illustrates a more detailed implementation example of FIG. 9A in accordance with an embodiment of the invention.

FIG. 9B illustrates a more detailed implementation example of FIG. 9A in accordance with an embodiment of the invention. Referring to FIG. 9B, 900B through 925B correspond to 900A through 925A of FIG. 9A, respectively, and will not be described further for the sake of brevity. At 930B, UE 2 successfully transmits four separate rewind requests that request 2, 3, 4 and 5 second rewind delays, respectively. In FIG. 9B, assume that rewind requests #1, #2 and #3 arrive at UE 1, at which point UE 1 selects the most recent rewind request for generating the rewind stream while ignoring any earlier (out-of-date) rewind requests, 935B. Thereby, the rewind stream is generated with a 4 second rewind delay at 935B, and the rewind stream is transmitted to UE 2 at 940B. Eventually, the rewind request #4 also arrives at UE 1, 945B. At this point, UE 1 ignores rewind request #4 not because it is too old, but rather because it arrives too late (i.e., UE 1 is already providing the rewind stream to UE 2). UE 2 receives, buffers and plays the rewind stream at 950B. Also, while not shown explicitly, the real-time media stream from 910B can either continue to be transmitted to UE 2 along with the rewind stream at 940B or alternatively the rewind stream can supplant the real-time media stream such that the real-time media stream ceases transmission at 940B. At 955B, UE 1 optionally determines if the rewind stream has caught up to real-time. If not, the process returns to 940B and UE 1 continues to deliver the rewind stream to UE 2. If so, the process returns to 910B, and UE 1 resumes delivery of the real-time media stream to UE 2 (although it is appreciated that UE 2 could have been providing the real-time media stream to other UEs while UE 2 was operating in rewind mode as noted above). The reason why 955B is optional is the same as the reason explained above with respect to 950A of FIG. 9A.

Figure 9C:
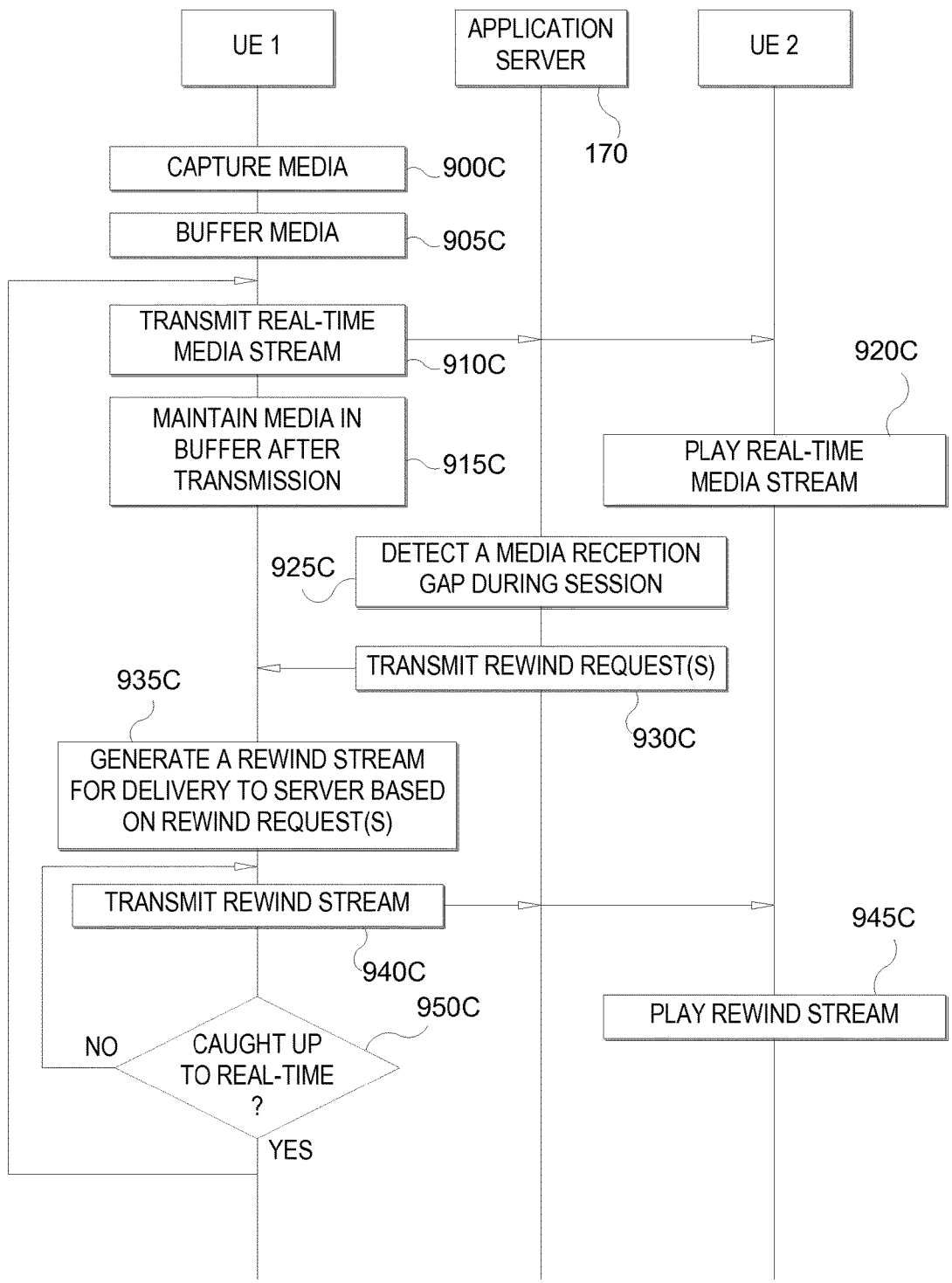
FIG. 9C illustrates an alternative implementation example of FIG. 9A in accordance with an embodiment of the invention.

FIG. 9C illustrates an alternative implementation example of FIG. 9A in accordance with an embodiment of the invention. Unlike FIG. 9A, in the embodiment of FIG. 9C, the transmitting device from FIGS. 7-8 corresponds to UE 1 but the target device corresponds to the application server 170 (with UE 2 being an indirect target device). Referring to FIG. 9C, 900C through 920C and 935C through 950C correspond to 900A through 920A and 935A through 950A of FIG. 9A, respectively, and will not be described further for the sake of brevity. 925C and 930C are similar to 925A and 930A, except that 925C and 930C are implemented at the application server 170 instead of UE 2.

Figure 10A:
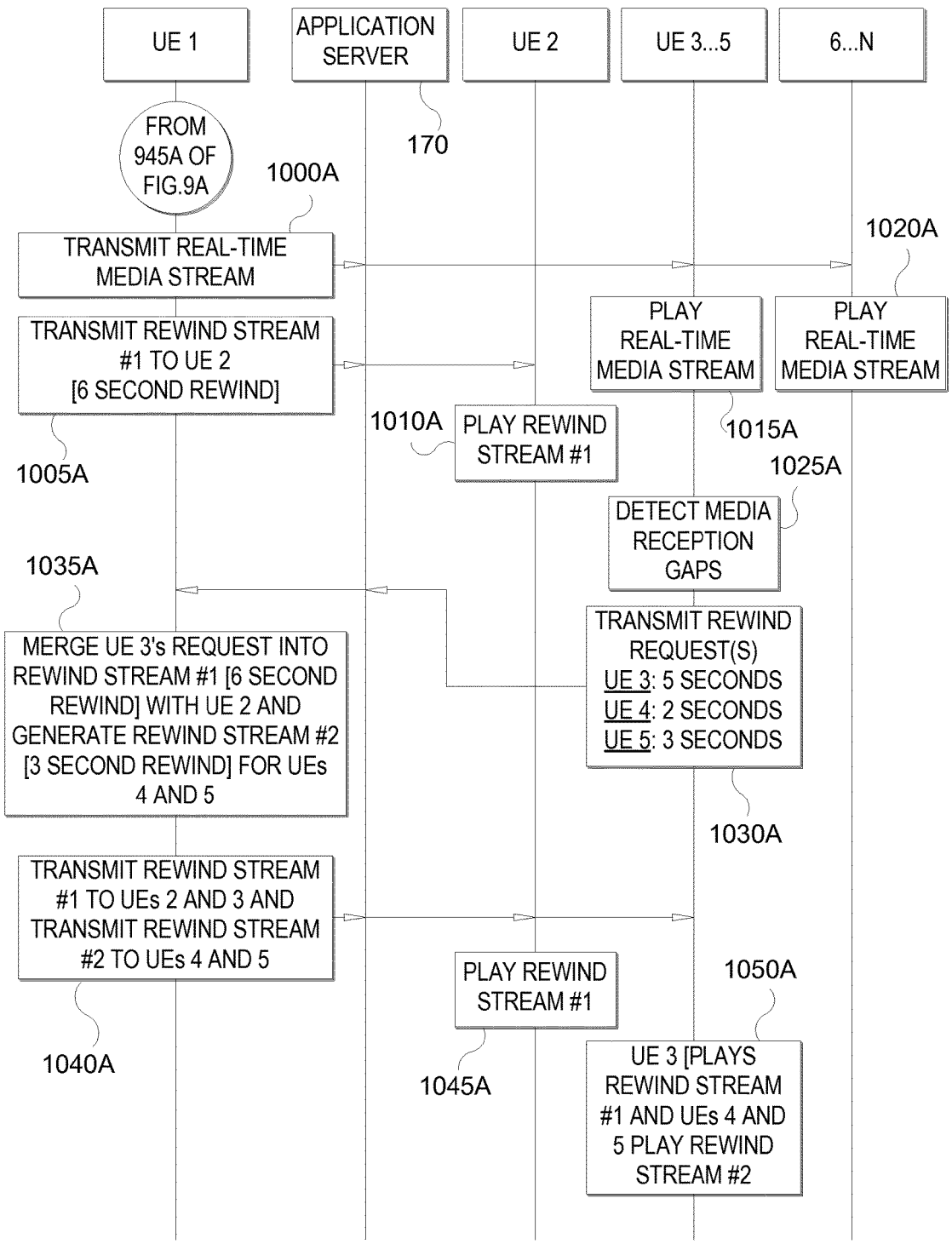
FIG. 10A illustrates a continuation of the process of FIG. 9A in accordance with another embodiment of the invention.

FIG. 10A illustrates a continuation of the process of FIG. 9A in accordance with another embodiment of the invention. In the embodiment of FIG. 10A, the transmitting device from FIGS. 7-8 corresponds to UE 1 and the target device corresponds to each of UEs 2 . . . N, where N is at least equal to 6. It will be appreciated that the real-time communication session in FIG. 10A corresponds to a group session.

Referring to FIG. 10A, assume that UE 2 is still in rewind mode after 945A of FIG. 9A. Accordingly, UE 1 transmits the real-time media stream to UEs 3 . . . N, 1000A, and UE 1 transmits the rewind stream from 935A-940A to UE 2, 1005A. In FIG. 10A, the rewind stream from 1005A is assumed to have a 6 second rewind delay (although this can change as the rewind stream catches up to the real-time media stream) and is referred to as rewind stream #1 hereafter because the description of FIG. 10A provided below includes reference to multiple rewind streams. UE 2 receives, buffers and plays the rewind stream #1, 1010A, and UEs 3 . . . N each receives, buffers and plays the real-time media stream, 1015A and 1020A. Also, while not shown explicitly, the real-time media stream from 1000A can either continue to be transmitted to UE 2 in addition to UEs 3 . . . N along with the rewind stream at 1005A or alternatively the rewind stream can supplant the real-time media stream such that the real-time media stream is not transmitted to UE 2 at 1005A.

Later, at some point during the real-time communication session, assume that UEs 3 . . . 5 each independently detect a media reception gap (e.g., as in 710 of FIG. 7), 1025A, and each of UEs 3 . . . 5 each independently transmit one or more rewind requests to UE 1, 1030A (e.g., as in 715 of FIG. 7). For example, at 1030A, each of UEs 3 . . . 5 can transmit rewind requests until their rewind stream is received or the rewind cap (e.g., 10 seconds, N total rewind requests, etc.) is reached. For convenience of explanation, at 1030A, assume that UE 3 requests a rewind stream with a 5 second delay, UE 4 requests a rewind stream with a 2 second delay and UE 5 requests a rewind stream with a 3 second delay.

UE 1 receives the rewind requests from UEs 3 . . . 5, and, instead of granting each of the rewind requests by generating four (4) independent rewind streams, UE 1 instead groups the rewind request for UE 3 with rewind session #1, and forms a new rewind stream #2 for handling the rewind requests for UEs 4 and 5, 1035A. As will be appreciated, transmitting X rewind streams to X target UEs can become burdensome as X increases in terms of processing, bandwidth constraints, etc., so forming rewind groups that share a common rewind delay can help to relieve this burden (e.g., the number of rewind groups can be based upon a processing constraint and/or a bandwidth constraint). In this case, the rewind delays for UEs 2 and 3 are relatively close (e.g., 5 and 6 seconds), so UEs 2 and 3 are grouped together in rewind stream #1 with the current 6 second rewind delay. Also, the rewind delays for UEs 4 and 5 are relatively close (e.g., 2 and 3 seconds), so UEs 4 and 5 are grouped together in rewind stream #2 with the current 3 second rewind delay. Thus, two rewind streams are generated to the lagging UEs in FIG. 10A instead of four independent rewind streams.

Referring to FIG. 10A, after merging UE 3's rewind request into rewind stream #1 and generating rewind stream #2, UE 1 transmits rewind stream #1 to UEs 2 and 3 and UE 1 also transmits rewind stream #2 to UEs 4 and 5, 1040A. UEs 2 and 3 each receive, buffer and play the rewind stream #1, 1045A, and UEs 4 and 5 each receive, buffer and play the rewind stream #2, 1050A. While not shown explicitly in FIG. 10A, if either rewind streams #1 or #2 catch up to real-time via execution of a catch-up protocol, the respective rewind stream can be replaced with the real-time media stream. Alternatively, the real-time media stream can simply continue to be delivered in conjunction with rewind streams #1 and/or #2 as noted above. Also, if rewind stream #1 catches up to rewind stream #2 before either rewind stream catches up to the real-time media stream, the two respective rewind streams can be merged into a single rewind stream that is delivered to each of UEs 2 . . . 5.

While not illustrated explicitly, it will be appreciated that FIG. 10A can be modified such that the application server 170 (instead of UEs 3 . . . 5) originate the rewind requests from 1030A, similar to FIG. 9C. In this alternative implementation of FIG. 10A, the transmitting device from FIGS. 7-8 corresponds to UE 1 while the target device corresponds to the application server 170 instead of the individual UEs 3 . . . 5.

Figure 10B:
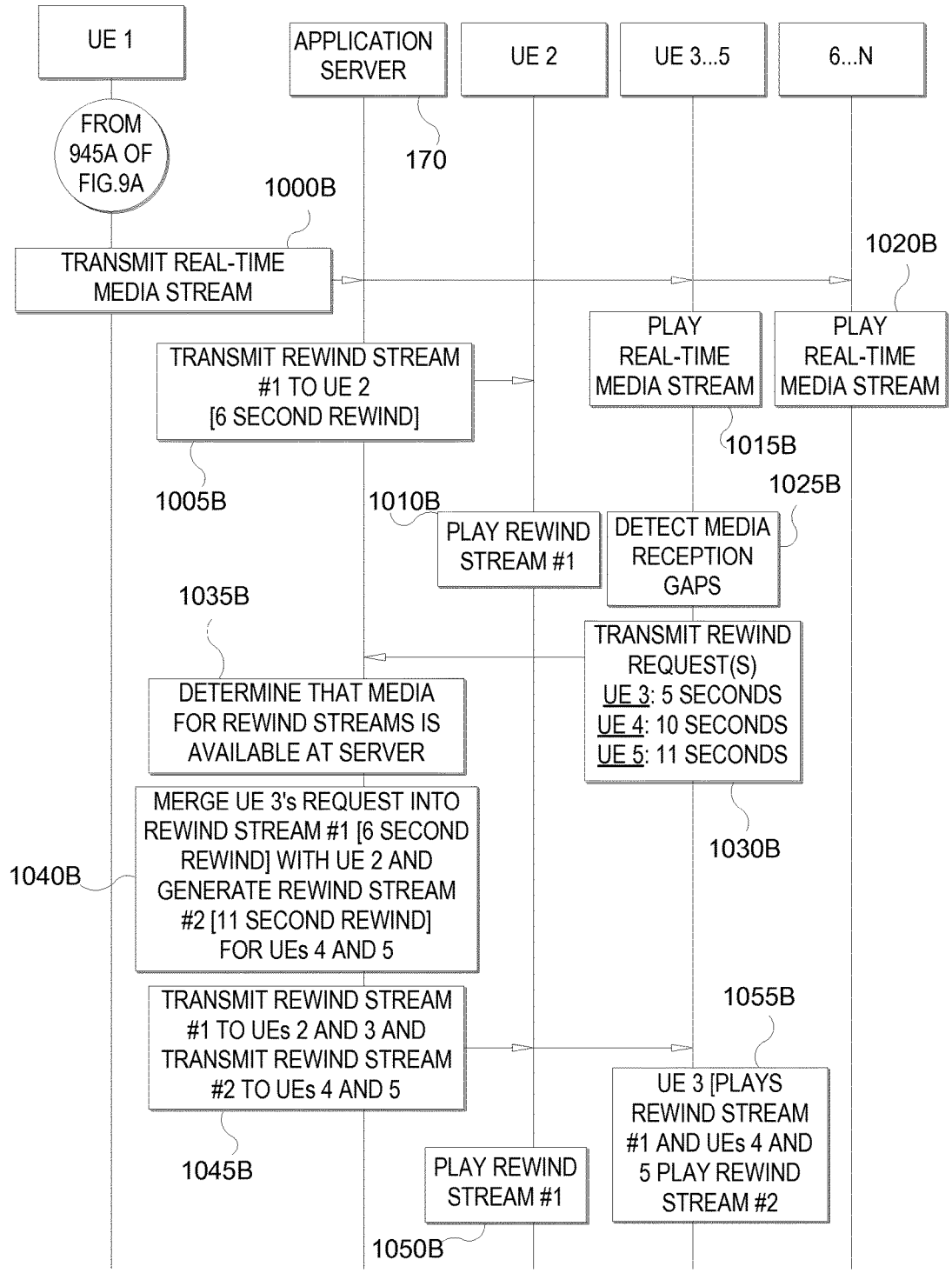
FIG. 10B illustrates an alternative implementation example of FIG. 10A in accordance with an embodiment of the invention.

FIG. 10B illustrates an alternative implementation example of FIG. 10A in accordance with an embodiment of the invention. Unlike FIG. 10A, in the embodiment of FIG. 10B, the target device corresponds to each of UEs 2 . . . N, where N is at least equal to 6, but the transmitting device from FIGS. 7-8 corresponds to the application server 170. This does not imply that UE 1 is not transmitting, but rather that the application server 170 is the entity that generates the rewind streams in FIG. 10B.

Referring to FIG. 10B, 1000B through 1030B and 1050B through 1055B substantially correspond to 1000A through 1030A and 1045A through 1050A of FIG. 10A, respectively, and will not be described further for the sake of brevity, except that the rewind stream of 1005B is being transmitted by the application server 170 instead of UE 1 as in 1005A of FIG. 10A. At 1035B, instead of simply forwarding the rewind requests from UEs 3 . . . 5 to UE 1 as in FIG. 10A, the application server 170 instead determines that the media frames for the requested rewind streams are available at the application server 170. In an example, this determination is possible based on buffering performed by the application server 170 during the session (e.g., the application server 170 can buffer 20-30 seconds of session data to accommodate rewind stream generation). 1040B and 1045B are similar to 1035A and 1040A of FIG. 10A, except that 1040B and 1045B are implemented at the application server 170 instead of UE 1. Also, in FIG. 10B, it is possible that the application server 170 can notify UE 1 that the application server 170 will take over the handling of the rewind stream delivery altogether, in which case UE 1 can stop transmitting rewind stream #1 to UE 2. Alternatively, the application server 170 can simply supplement the rewind streams being carried by UE 1, in which case the application server 170 could generate and deliver rewind stream #2 to UEs 3 and 4, while notifying UE 1 to transmit rewind stream #1 to UE 3 in addition to UE 2. In yet another alternative, the application server 170 can simply continue to receive rewind stream #1 and forward rewind stream #1 to both UEs 2 and 3 instead of UE 2. In this case, UE 1 does not necessarily need to be notified that rewind stream #1 is being delivered to UE(s) other than UE 2.

Figure 11:
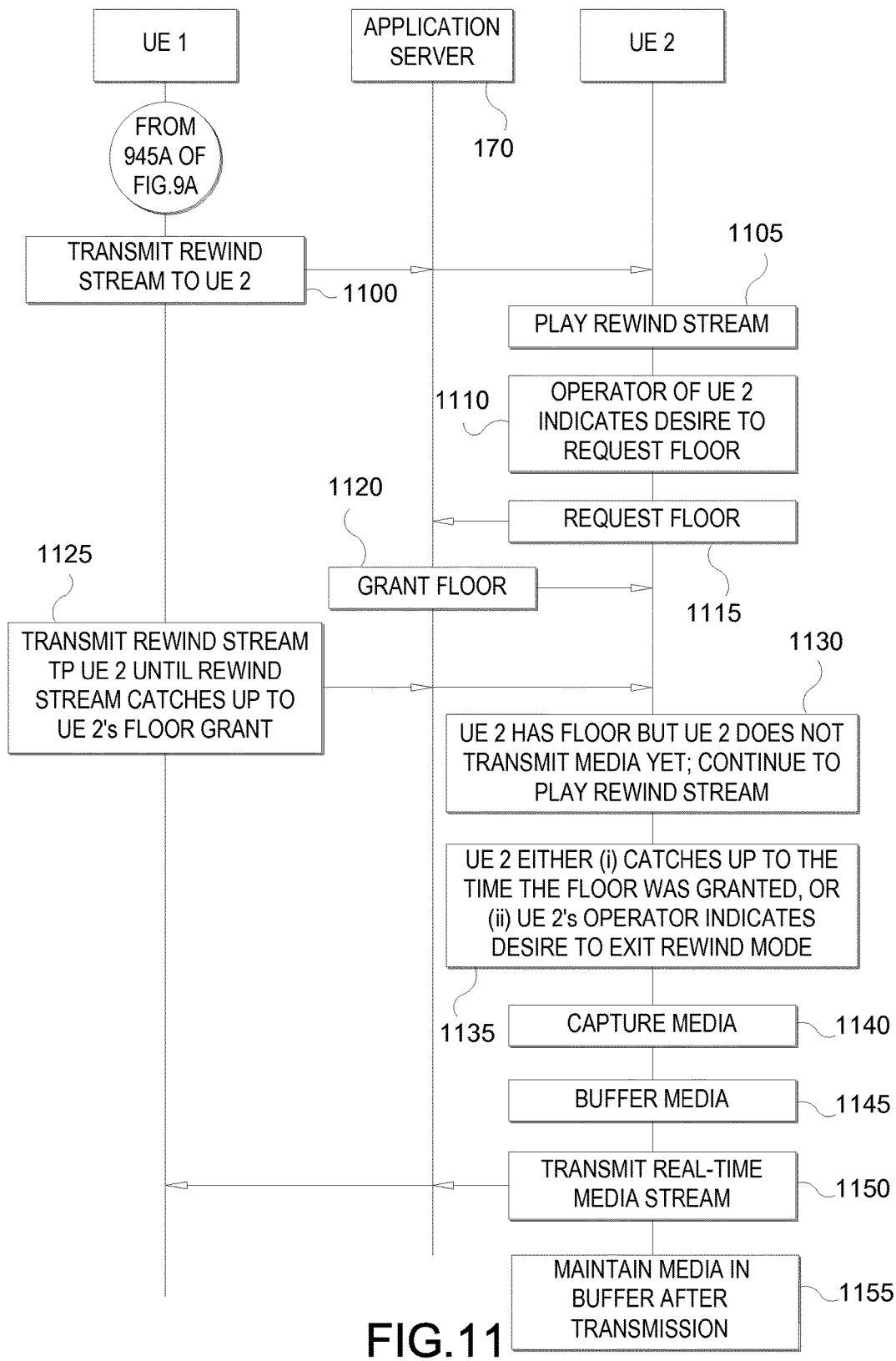
FIG. 11 illustrates a process of transitioning a floor to a target UE while the target UE is operating in rewind mode in accordance with an embodiment of the invention.

When a target UE is operating in rewind mode, the target UE is playing media from the near-past (e.g., media that is 3 seconds old, 7 seconds old, etc.). In an audio example, the operator of the target UE may be listening to another user talk while in rewind mode and may want to interrupt the other user and say something, but this is not possible because the target UE is not actually operating in real-time. FIG. 11 illustrates a process of transitioning a floor to a target UE while the target UE is operating in rewind mode in accordance with an embodiment of the invention. In the embodiment of FIG. 11, the real-time communication session is half-duplex and can be either a group session or a 1:1 or direct session. Also, for convenience of explanation, FIG. 11 is described as a continuation of the process of FIG. 9A.

Referring to 11, UE 1 continues to transmit the rewind frame (from 935A-940A of FIG. 9A) to UE 2, 1100, and UE 2 continues to receive, buffer and play the rewind frame, 1105. At some point during the real-time communication session while UE 2 is still operating in rewind mode, assume that the operator of UE 2 indicates his/her desire to obtain the floor for the session, 1110 (e.g., by pushing a PTT button, by beginning to speak, etc.). In response to the indication from 1110, a floor request is transmitting to the application server 170 while UE 2 is still in rewind mode, 1115, and the application server 170 grants the floor, 1120. However, even though UE 2 has the floor, UE 2 has not actually caught up to real-time yet. Accordingly, UE 1 continues to transmit the rewind stream until the rewind stream catches up to the time at which UE was granted the floor, 1125 and UE 2 continues to play the rewind stream even though UE 2 has the floor, 1130. Also at 1130, UE 2 does not actually transmit any of its operator's media to UE 1 while the rewind stream is still being played. At 1135, UE 2 either catches up to the time at which the floor was granted to UE 2 in the rewind session, or the operator of UE 2 wants to skip past any remaining portion of the rewind session so that the operator can begin transmitting media to UE 1. In an example, the rewind stream can be converted from audio data to text after UE 2 is granted the floor in accordance with a catch-up protocol (e.g., by UE 1, the application server 170 or UE 2 itself), in which case the operator of UE 2 may wish to read the rewind session while at the same time being able to transmit to UE 2. Once UE 2 obtains the floor and is no longer operating in rewind mode, 1140 through 1155 substantially correspond to 900A through 915A except for being implemented at UE 2 instead of UE 1, and will not described further for the sake of brevity.

The above-described embodiments have generally been described with respect to media reception gaps (device-detected or user-detected) that trigger transitions of sessions, for certain target devices, from real-time mode to rewind mode. During either mode of operation (rewind or real-time), a closed loop feedback protocol can be implemented to provide real-time feedback relating to session quality to a current transmitter (e.g., a floor-holder in half-duplex) of the real-time communication session. This scenario is described in more detail below with respect to FIG. 12. The real-time feedback is one example of how implicit rewind requests can be implemented, whereby the transmitting device interprets certain real-time feedback as an implicit request to begin delivery of a rewind stream (or modify the delivery of an existing rewind stream).

Figure 12:
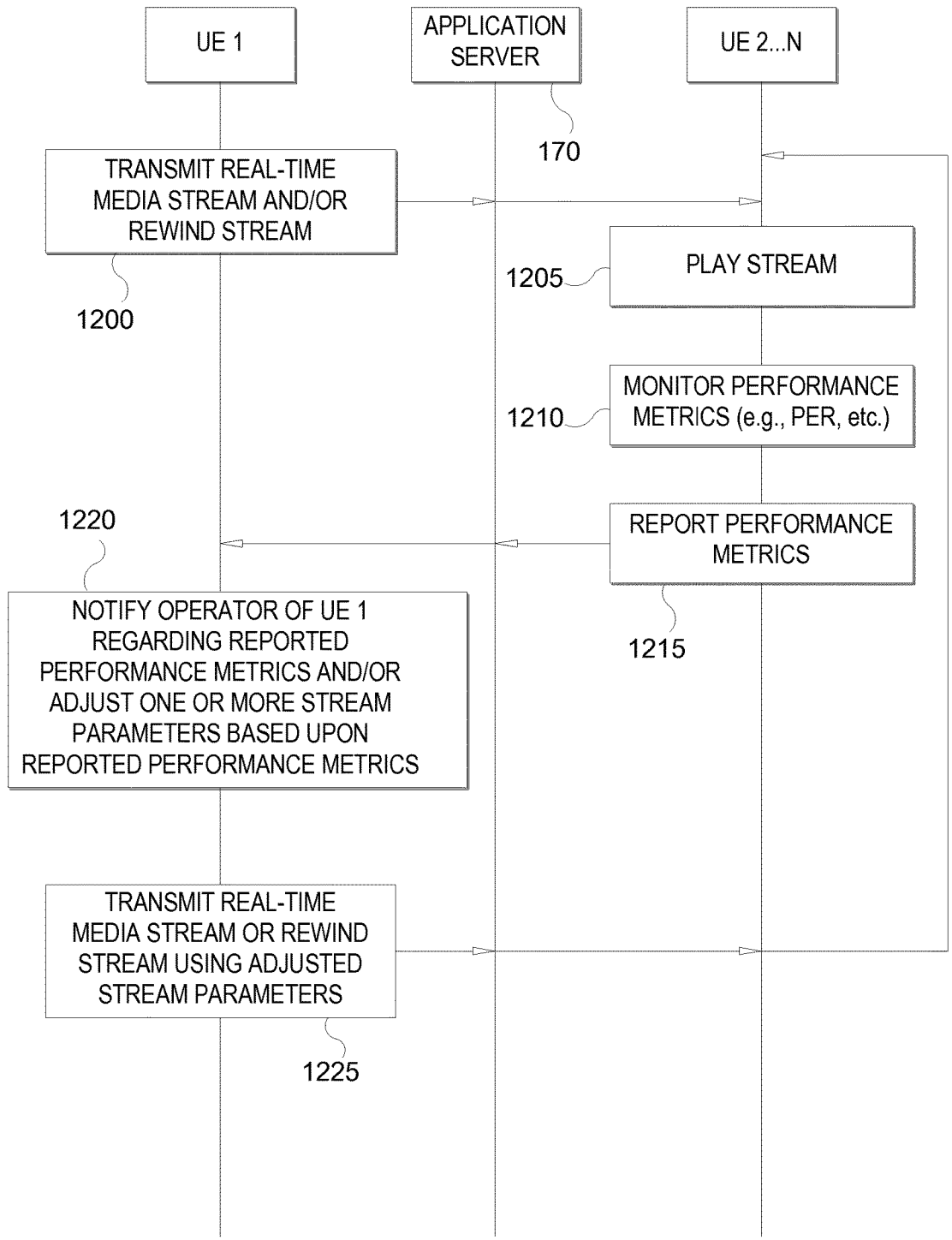
FIG. 12 illustrates a process of exchanged closed loop feedback during a real-time communication session in accordance with an embodiment of the invention.

Referring to FIG. 12, UE 1 transmits a set of media streams (e.g., a real-time media stream and/or rewind media stream(s)) to UEs 2 . . . N, 1200. UEs 2 . . . N each receive, buffer and play their respective media streams, 1205, while monitoring performance metrics associated with their respective media streams, 1210. For example, the performance metrics monitored by UEs 2 . . . N at 1210 can include packet error rate (PER), etc. At 1215, UEs 2 . . . N report the performance metrics to UE 1. In an example, UEs 2 . . . N can report the performance metrics at 1215 in accordance with a given interval (e.g., every ¼ second, every 10 seconds, etc.), which can vary from UE to UE or can be constant across UEs 2 . . . N. Further, the manner in which the performance metrics are reported can either correspond to an explicit number (e.g., 13 packets dropped in the previous 10 second reporting interval) or to a quality range. Alternatively, the performance metrics may be reported as a number to UE 1 and then converted by UE 1 into the quality range for presentation to an operator of UE 1.

UE 1 receives the reported performance metrics from UEs 2 . . . N, after which UE 1 notifies an operator of UE 1 regarding the reported performance metrics and/or adjusts one or more stream parameters based on the reported performance metrics, 1220. If UE 1 determines to adjust the one or more stream parameters based upon the reported performance metrics at 1220, the adjusted media stream(s) are transmitted at 1225. As will be appreciated, the optional adjustment at 1220 can affect the real-time media stream, one or more of the rewind streams (if present), or both. In an example, the optional adjustment at 1220 can include one or more of (i) stopping the real-time media stream and generating and then transmitting the rewind stream, (ii) generating and then transmitting the rewind stream in addition to the real-time media stream for concurrent parallel delivery of both streams, (iii) modifying a format or quality level of the real-time media stream without generation of the rewind stream, (iv) modifying a format or quality level of an existing rewind stream and/or (v) any combination thereof.

Referring to FIG. 12, expanding on the example whereby the performance metrics are presented as being one of a plurality of quality ranges, assume that each of UEs 2 . . . N uses a 10 seconds reporting cycle, and a bundling-factor of 6=~83 packets/10-sec. At each second, UEs 2 . . . N evaluate the packets received (and average packet delay). If less than two (2) packets were dropped at a given UE, the given UE reports "good" quality at 1215, and no stream parameter adjustment or notification is necessary at 1220 for that particular UE. If between 2 and 5 packets were dropped at the given UE, the given UE can report "some loss" at 1215, UE 1 can potentially drop the frame rate, the overall amount of data, increasing throughput, and/or applying interleaving to the media stream being delivered to the given UE. If more than 5 packets were dropped at the given UE, the given UE can report "high loss" at 1215 and can also attempt to identify why so many packets were lost. For example, if the lost packets clumped together in one burst, the given UE can issue a rewind command as discussed above. In another example, if the lost packets were spread more evenly, this could be a sign of poor channel conditions at the given UE, in which case the given can send a "high loss—poor channel conditions" note to UE 1 (e.g., as a text or audio note in an example, which can be presented by UE 1 to its operator at 1220). As will be appreciated, conveying knowledge of the packet loss being experienced at UEs 2 . . . N to an operator of UE 1 can help prompt the operator to take certain actions that can improve the user experience for the call (e.g., the operator can speak more slowly so UEs in poor channel conditions can understand what is being said, the operator can start sending text instead of audio, etc.).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a receiving device that is receiving data from a transmitting device during a real-time communication session, comprising:
   detecting, while the receiving device is monitoring a real-time media stream from the transmitting device, a media reception gap;
   transmitting, in response to the detection, a rewind request to the transmitting device that is configured to trigger the transmitting device to generate and provide a time-delayed version of the real-time media stream that includes media lost during the media reception gap; and
   receiving a rewind stream in response to the rewind request,
   wherein the rewind stream is configured to be played by the receiving device independently from the real-time media stream.

2. The method of claim 1, further comprising:
   continuing to receive the real-time media stream while the rewind stream is being received.

3. The method of claim 1, wherein receipt of the real-time media stream stops while the rewind stream is being received in response to the rewind request.

4. The method of claim 1, wherein the rewind request corresponds to an implicit rewind request that conveys information configured for evaluation by the transmitting device to permit the transmitting device to independently trigger generation and delivery of the rewind stream.

5. The method of claim 4, wherein the conveyed information relates to the media reception gap.

6. The method of claim 1, wherein the rewind request corresponds to an explicit rewind request that explicitly requests the transmitting device to provide the time-delayed version of the real-time media stream.

7. The method of claim 6,
   wherein the explicit rewind request requests the transmitting device to provide the time-delayed version of the real-time media stream with a first amount of delay relative to the real-time media stream,
   wherein the rewind stream includes a second amount of delay relative to the real-time media stream that is different than the first amount of delay.

8. The method of claim 1,
   wherein the receiving device corresponds to a target user equipment (UE) that is participating in the real-time communication session and the target UE plays the rewind stream, or
   wherein the receiving device corresponds to a server that is arbitrating and/or mediating the real-time communication session and the server transmits the rewind stream to at least one target UE participating in the real-time communication session.

9. The method of claim 1, wherein the media reception gap corresponds to (i) a first time gap where less than a threshold number of usable media packets for the real-time media stream successfully arrive at the receiving device, or (ii) a second time gap where the threshold number of usable media packets for the real-time media stream are available but conditions at the receiving device inhibit playback by the receiving device.

10. The method of claim 1, wherein the media reception gap occurs based on network connection degradation.

11. The method of claim 10, wherein the network connection degradation occurs on a connection between a serving network and the receiving device and/or a backhaul connection.

12. The method of claim 1, further comprising:
executing a catch-up protocol with respect to the rewind stream so that the rewind stream will catch up to the real-time media stream.

13. The method of claim 1, wherein the real-time communication session is a half-duplex session and the receiving device is a target user equipment (UE) participating in the real-time communication session as a non-floorholder while the rewind stream is being received, further comprising:
requesting a floor for the real-time communication session while the receiving device is receiving the rewind stream;
receiving an indication that the floor is granted to the receiving device in response to the floor request;
continuing to receive and play the rewind stream after the indication is received until (i) the rewind stream catches up to a time at which the floor is granted to the receiving device, and/or (ii) the receiving device determines to exit rewind mode; and
beginning to transmit media for the real-time communication session as a floorholder after (i) or (ii).

14. The method of claim 1, further comprising:
monitoring one or more performance metrics associated with the real-time media stream and/or the rewind stream; and
reporting the one or more performance metrics to an originator of the real-time media stream and/or the rewind stream.

15. The method of claim 14, wherein the one or more performance metrics include a packet error rate (PER) of the real-time media stream and/or the rewind stream.

16. A method of operating a transmitting device that is transmitting data to a set of target devices during a real-time communication session, comprising:
transmitting a real-time media stream for the real-time communication session to the set of target devices;
receiving, from at least one target device from the set of target devices, a rewind request that is configured to trigger the transmitting device to generate and provide a time-delayed version of the real-time media stream that includes media lost during a media reception gap detected by the set of target devices;
generating a rewind stream based on the rewind request that is configured to be played by the at least one target device independently from the real-time media stream; and
transmitting the rewind stream to the at least one target device.

17. The method of claim 16, further comprising:
continuing to transmit the real-time media stream while the rewind stream is being transmitted.

18. The method of claim 16, further comprising:
stopping transmission of the real-time media stream to the at least one target device while the rewind stream is being transmitted.

19. The method of claim 16,
wherein the rewind request corresponds to an implicit rewind request that conveys information configured for evaluation by the transmitting device to permit the transmitting device to independently determine to trigger generation and delivery of the rewind stream, or
wherein the rewind request corresponds to an explicit rewind request that explicitly requests the transmitting device to provide the time-delayed version of the real-time media stream.

20. The method of claim 16, wherein the transmitting device corresponds to an originating user equipment (UE) that is participating in the real-time communication session.

21. The method of claim 20,
wherein the at least one target device corresponds to at least one target user equipment (UE) participating in the real-time communication session, or
wherein the at least one target device corresponds to a server that is arbitrating and/or mediating the real-time communication session.

22. The method of claim 16,
wherein the transmitting device corresponds to a server that is arbitrating and/or mediating the real-time communication session, and
wherein the at least one target device corresponds to at least one target user equipment (UE) participating in the real-time communication session.

23. The method of claim 16, wherein the media reception gap corresponds to (i) a first time gap where less than a threshold number of usable media packets for the real-time media stream successfully arrive at the at least one target device, or (ii) a second time gap where the threshold number of usable media packets for the real-time media stream successfully arrive at the at least one target device but conditions at the at least one target device inhibit playback by the at least one target device.

24. The method of claim 16, further comprising:
executing a catch-up protocol with respect to the rewind stream so that the rewind stream will catch up to the real-time media stream.

25. The method of claim 16, further comprising:
receiving, from the at least one target device, a report related to one or more performance metrics monitored by the at least one target device in association with the real-time media stream and/or the rewind stream; and
presenting a notification related to the report, and/or adjusting one or more stream parameters associated with the real-time media stream and/or the rewind stream based on the report.

26. The method of claim 25, wherein the one or more performance metrics include a packet error rate (PER) at the at least one target device for the real-time media stream and/or the rewind stream.

27. The method of claim 16,
wherein N rewind requests are received from N target devices that each request different time-delayed versions of the real-time media stream,
wherein the generating generates a set of rewind streams, wherein the set of rewind streams includes less than N rewind streams and each rewind stream in the set of rewind streams is associated with a version of the real-time media stream with a different amount of delay relative to the real-time media stream,
wherein each of the N target devices is allocated to a given rewind stream in the set of rewind streams based upon (i) its requested time-delayed version of the real-time media stream, and (ii) a with a given amount of delay relative to the real-time media stream for the given rewind stream.

28. The method of claim 27, wherein a number of rewind streams in the set of rewind streams is based at least in part upon a bandwidth constraint or a processing constraint.

29. A receiving device that is receiving data from a transmitting device during a real-time communication session, comprising:
- logic configured to detect, while the receiving device is monitoring a real-time media stream from the transmitting device, a media reception gap;
- logic configured to transmit, in response to the detection, a rewind request to the transmitting device that is configured to trigger the transmitting device to generate and provide a time-delayed version of the real-time media stream that includes media lost during the media reception gap; and
- logic configured to receive a rewind stream in response to the rewind request,
- wherein the rewind stream is configured to be played by the receiving device independently from the real-time media stream.

30. A transmitting device that is transmitting data to a set of target devices during a real-time communication session, comprising:
- logic configured to transmit a real-time media stream for the real-time communication session to the set of target devices;
- logic configured to receive, from at least one target device from the set of target devices, a rewind request that is configured to trigger the transmitting device to generate and provide a time-delayed version of the real-time media stream that includes media lost during a media reception gap detected by the set of target devices;
- logic configured to generate a rewind stream based on the rewind request that is configured to be played by the at least one target device independently from the real-time media stream; and
- logic configured to transmit the rewind stream to the at least one target device.

* * * * *